(12) United States Patent
Jin et al.

(10) Patent No.: US 8,222,344 B2
(45) Date of Patent: Jul. 17, 2012

(54) WEATHER RESISTANT THERMOPLASTIC RESIN HAVING EXCELLENT LOW GLOSS CHARACTERISTICS AND METHOD OF PREPARING THE SAME

(75) Inventors: Young Sub Jin, Uiwang-si (KR); Sung Kwan Kim, Uiwang-si (KR); Hwan Seok Park, Uiwang-si (KR); Jae Keun Hong, Uiwang-si (KR); Byeong Do Lee, Uiwang-si (KR); Ho Ryong Sun, Uiwang-si (KR); Bong Sil Jang, Uiwang-si (KR); Chul In Lim, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 234 days.

(21) Appl. No.: 12/605,541

(22) Filed: Oct. 26, 2009

(65) Prior Publication Data

US 2010/0105840 A1    Apr. 29, 2010

(30) Foreign Application Priority Data

Oct. 29, 2008   (KR) ................................ 2008-106664

(51) Int. Cl.
| | |
|---|---|
| C08L 25/02 | (2006.01) |
| C08L 33/02 | (2006.01) |
| C08L 33/04 | (2006.01) |
| C08L 33/18 | (2006.01) |
| C08L 33/20 | (2006.01) |
| C08L 35/02 | (2006.01) |

(52) U.S. Cl. ......... 525/221; 525/222; 525/230; 525/241
(58) Field of Classification Search ................. 525/221, 525/222, 238, 241
See application file for complete search history.

(56) References Cited

U.S. PATENT DOCUMENTS

| | | | |
|---|---|---|---|
| 3,426,101 A | 2/1969 | Ryan et al. | |
| 3,944,631 A | 3/1976 | Yu et al. | |
| 4,169,869 A | 10/1979 | Milenius | |
| 4,460,742 A | 7/1984 | Kishida et al. | |
| 4,652,614 A | 3/1987 | Eichenauer et al. | |
| 4,668,737 A | 5/1987 | Eichenauer et al. | |
| 5,237,004 A | 8/1993 | Wu et al. | |
| 5,475,053 A | 12/1995 | Niessner et al. | |
| 5,580,924 A | 12/1996 | Wildi et al. | |
| 5,910,553 A | 6/1999 | McKee et al. | |
| 6,051,656 A | 4/2000 | McKee et al. | |
| 6,111,024 A | 8/2000 | McKee et al. | |
| 6,187,862 B1 | 2/2001 | Chang et al. | |
| 6,395,828 B1 | 5/2002 | Chang et al. | |
| 6,696,165 B1 | 2/2004 | Bennett et al. | |
| 6,890,965 B1 | 5/2005 | Johnson et al. | |
| 2004/0024122 A1 | 2/2004 | Chang et al. | |
| 2007/0287799 A1 | 12/2007 | Ha et al. | |

FOREIGN PATENT DOCUMENTS

| | | |
|---|---|---|
| DE | 19614846 A1 | 10/1997 |
| JP | 7-316243 A | 12/1995 |
| KR | 10-0440474 A | 5/2003 |
| KR | 2006-0051425 A1 | 12/2007 |
| KR | 2008-0036790 A | 4/2008 |

OTHER PUBLICATIONS

European Search Report in counterpart European Application No. 09174487, dated Feb. 16, 2010.
European Office Action in counterpart European Application No. 09174487 dated May 11, 2011, pp. 1-4.

*Primary Examiner* — Nathan M Nutter
(74) *Attorney, Agent, or Firm* — Summa, Additon & Ashe, P.A.

(57) ABSTRACT

A weather resistant thermoplastic resin having excellent low gloss characteristics according to the present invention comprises a (meth)acrylic acid alkyl ester-based polymer (A) and an aromatic vinyl-cyanide vinyl based copolymer (B), wherein the (meth)acrylic acid alkyl ester-based polymer (A) forms a network-shaped disperse phase, and the aromatic vinyl-cyanide vinyl based copolymer (B) forms a continuous phase. The thermoplastic resin has excellent low gloss characteristics as well as superior weatherability, impact resistance, thermal resistance, delamination characteristics, and the like.

34 Claims, 4 Drawing Sheets

[Fig. 1]
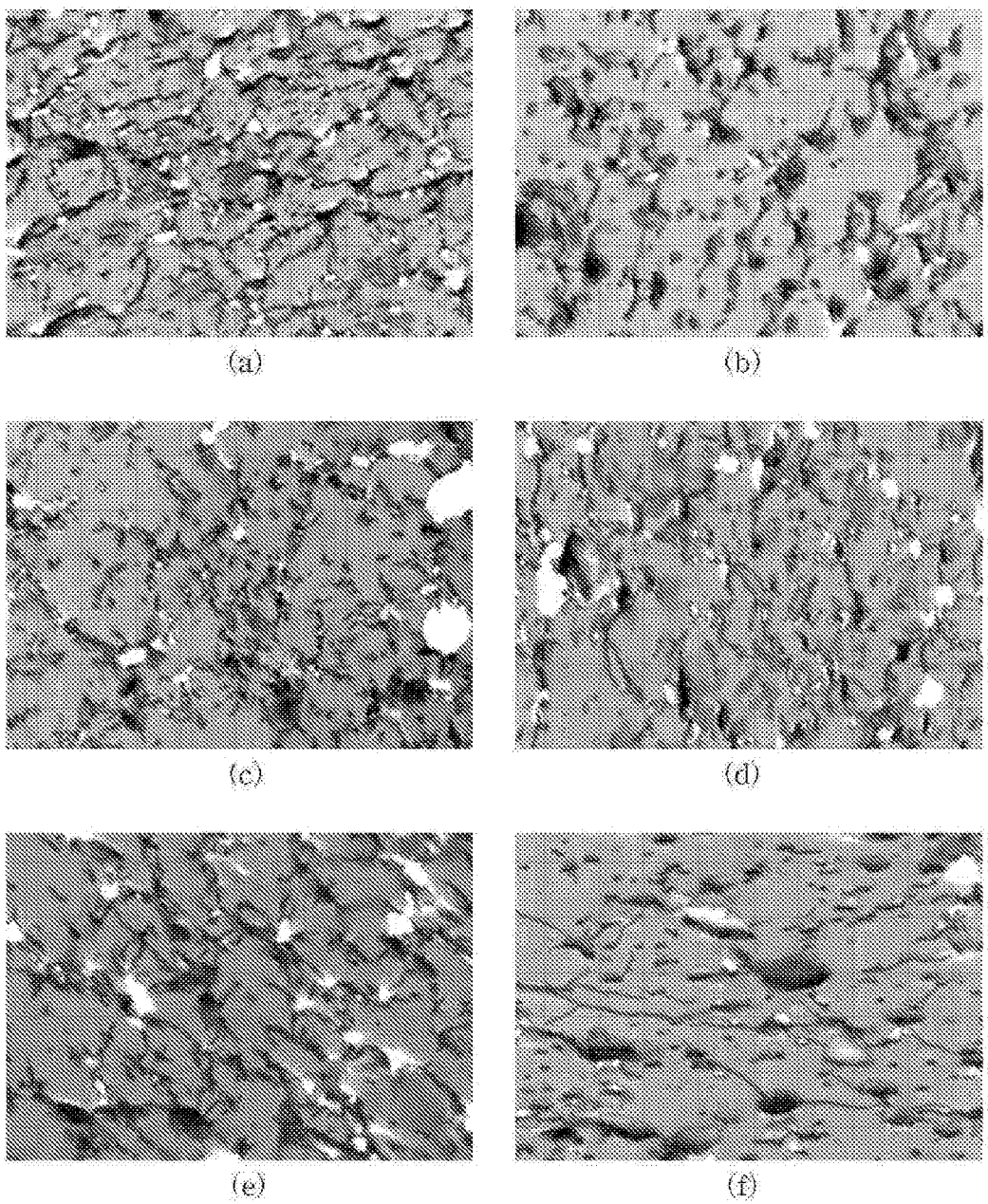

【Fig. 2】
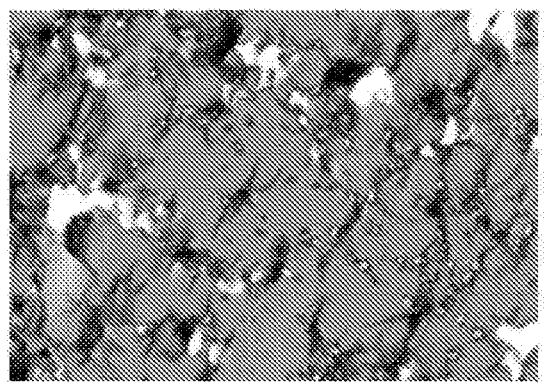
(a)
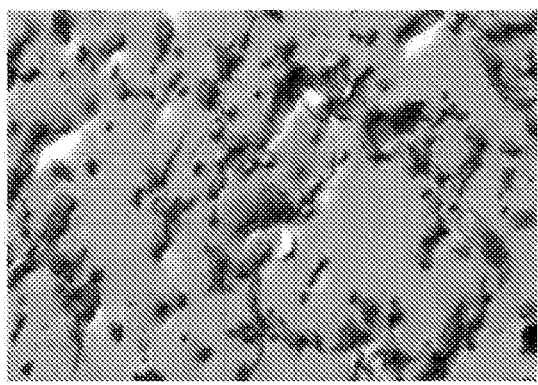
(b)
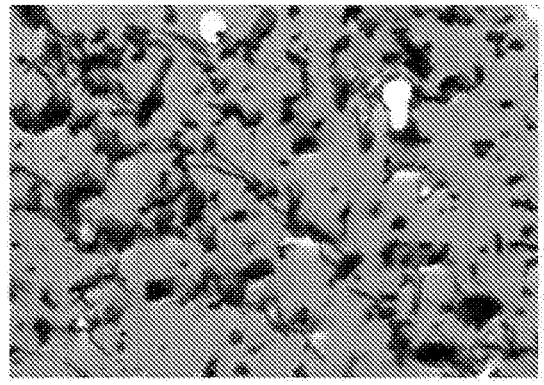
(c)
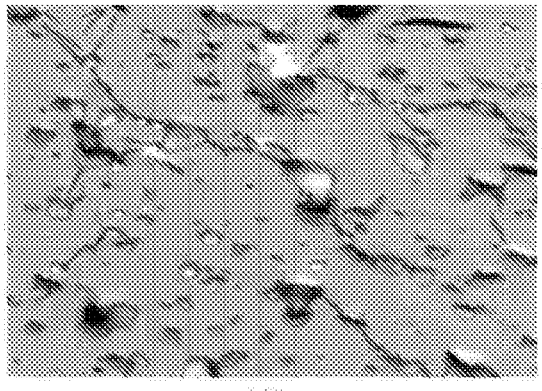
(d)

【Fig. 3】
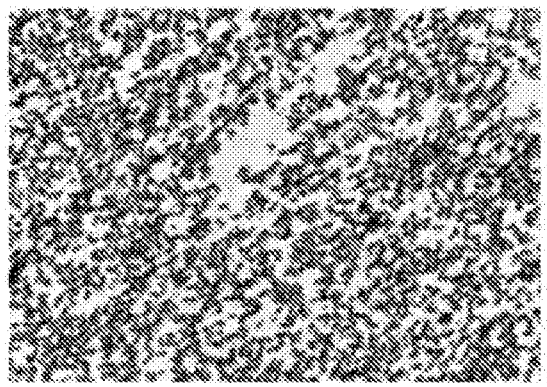
(a)
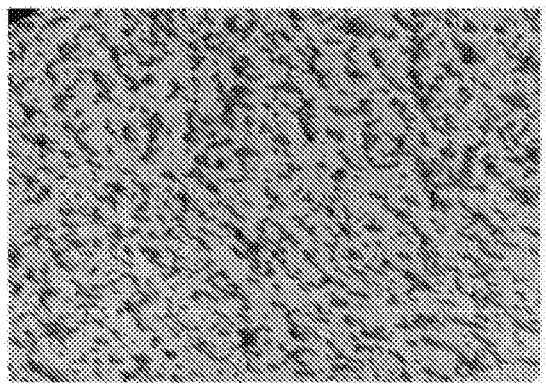
(b)
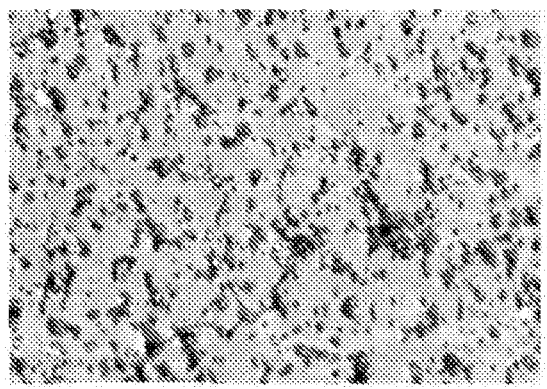
(c)

【Fig. 4】
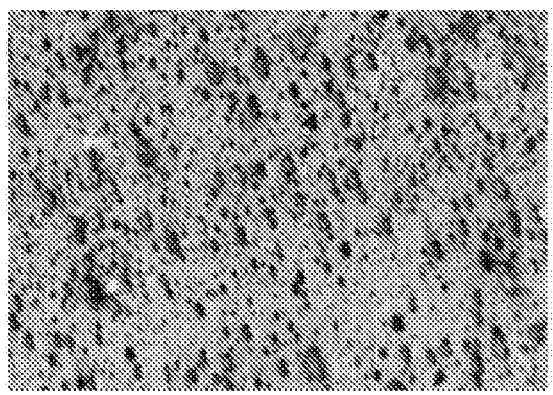 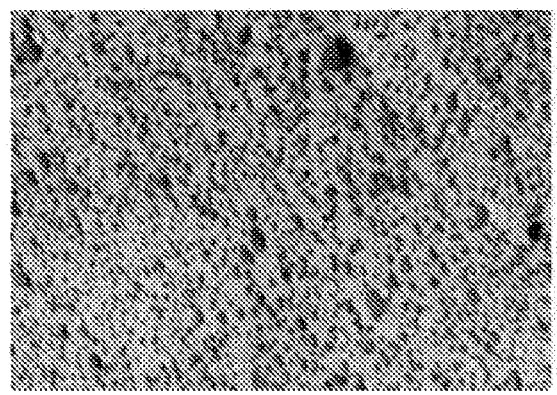
(a)            (b)

WEATHER RESISTANT THERMOPLASTIC RESIN HAVING EXCELLENT LOW GLOSS CHARACTERISTICS AND METHOD OF PREPARING THE SAME

CROSS REFERENCE TO RELATED APPLICATIONS

This application claims priority from Korean Patent Application No. 2008-106664, filed Oct. 29, 2008 in the Korean Intellectual Property Office, the disclosure of which is incorporated herein by reference in its entirety.

FIELD OF THE INVENTION

The present invention relates to a weather resistant thermoplastic resin having excellent low gloss characteristics and a method of preparing the same.

BACKGROUND OF THE INVENTION

Acrylonitrile-butadiene-styrene resins (also "ABS" resins) are used in a variety of applications including automobiles, electric and electronic equipment, business machinery, home appliances, toys, and the like due to their excellent impact resistance and workability, superior mechanical strength, thermal deformation temperature, and beautiful external appearance. However, ABS resins are easily deteriorated by sunlight and ultraviolet (UV) radiation since the butadiene-based rubber component used in the ABS resins comprises a chemically unstable double bond. Therefore, the use of ABS resins is limited for many products that are used outdoors and/or exposed to UV radiation, such as electric and electronic components, materials for farm machines and implements, road signboards, finishing materials for buildings, door panels, window frames, leisure/household goods, sports equipment, automobile supplies, and the like.

Weather resistant stabilizers can be added to ABS resins to improve weatherability. Techniques using weather resistant stabilizers can, however, have limited effectiveness. Accordingly, research efforts have looked to replacing ABS resins with acrylate-styrene-acrylonitrile (also "ASA" resins) resins, which include a chemically stable acryl-based rubber instead of a butadiene-based rubber.

Recently, there has also been an increased focus on the development of thermoplastic resins that can be directly used without coating or painting due to environmental concerns. In addition, there is also increased demand for thermoplastic resins with low gloss characteristics in view of customer expectations, who often prefer the high-grade external appearance of low gloss products. For example, ASA resins used for outdoor applications can require low gloss characteristics.

Conventional methods for imparting a low gloss appearance to the surface of molded articles include embossing a surface of a molded article and coating the surface of the molded article with a low gloss material. The processing costs for such methods, however, can be expensive. Further, such methods may not sufficiently lower surface gloss. Therefore, there have been attempts to modify the ASA resins themselves to impart sufficiently low gloss characteristics.

U.S. Pat. No. 6,696,165 discloses a method for lowering the gloss of ASA resins by adding 0.1 to 20 parts by weight of a crystalline polymer such as a polyalkylterephthalate, and U.S. Pat. No. 6,395,828 discloses a method for lowering the gloss of ASA resins by adding 0.5 to 15 parts by weight of a compound prepared by a reaction of an amine compound with epoxy.

U.S. Pat. Nos. 5,475,053, 4,652,614, and the like disclose methods of lowering the gloss of resins by using spherical graft copolymers as matting agents, and U.S. Pat. Nos. 4,169,869, 4,460,742 and 5,580,924, Korean Patent Laid-Open Publication No. 2008-0036790 and the like disclose methods of lowering the gloss of resins by using a variety of copolymers as additives.

Further, U.S. Pat. Nos. 4,668,737, 5,237,004, and the like disclose methods of lowering the gloss of resins by using rubber particles having a core/shell structure with a large particle diameter range of 0.05 to 20 μm or 2 to 15 μm.

However, problems including high production costs, delamination, property deterioration and partially increased gloss may occur when the additives are used as in the foregoing techniques. In addition, the use of large rubber particles can rapidly deteriorate the impact strength of the resins although the gloss of the resins can be advantageously lowered.

U.S. Pat. Nos. 3,426,101 and 6,187,862, Japanese Patent Laid-Open Publication No. Hei 7-316243, Korean Patent No. 10-0440474, Korean Patent Application No. 2006-0051425, and the like, are directed to methods of preparing ASA resins by conventional techniques generally comprising the steps of preparing an alkyl acrylate-based latex core, preparing a graft polymer by graft polymerizing styrene and acrylonitrile on an outer layer of the core, and melting and kneading (mixing) the prepared graft polymer and a styrene-based thermoplastic resin. However, such methods of preparing the ASA resins use multiple steps which can increase production costs. Further such methods typically use a variety of emulsifiers and stabilizers to prepare the latex, which can deteriorate color characteristics.

U.S. Pat. Nos. 5,910,553, 6,111,024, 6,051,656, and the like disclose methods of preparing ASA resins by preparing alkyl acrylate copolymers through solution polymerization, drying the alkyl acrylate copolymers, performing bulk polymerization by injecting the dried alkyl acrylate copolymers into styrene-based monomers and acrylonitrile-based monomers, and converting the bulk polymerization into the suspension polymerization. However, these methods are not commercially viable, and there is the further drawback of additionally requiring a process to recover the final product from a suspension.

As discussed in the foregoing, despite the many attempts to provide ASA resins with excellent weatherability and low gloss characteristics, conventional techniques do not provide sufficient weatherability and gloss properties.

SUMMARY OF THE INVENTION

The present inventors have developed a weather resistant thermoplastic resin having excellent low gloss characteristics comprising a (meth)acrylic acid alkyl ester-based polymer which forms a network-shaped disperse phase and an aromatic vinyl-cyanide vinyl based copolymer which forms a continuous phase, and a method of preparing the same.

The present invention provides a weather resistant thermoplastic resin having excellent low gloss characteristics, while maintaining physical properties such as weatherability, impact strength, thermal resistance, and the like, and a method of preparing a weather resistant thermoplastic resin through a continuous bulk polymerization method.

According to one aspect of the present invention, there is provided a weather resistant thermoplastic resin having excellent low gloss characteristics and a method of preparing the same. In an exemplary embodiment of the present invention, the thermoplastic resin comprises a (meth)acrylic acid alkyl ester-based polymer (A) and an aromatic vinyl-cyanide vinyl based copolymer (B), wherein the (meth)acrylic acid alkyl ester-based polymer (A) forms a network-shaped disperse phase and the aromatic vinyl-cyanide vinyl based copolymer (B) forms a continuous phase.

In an exemplary embodiment of the present invention, the thermoplastic resin comprises about 5 to about 35% by weight of the (meth)acrylic acid alkyl ester-based polymer (A) and about 65 to about 95% by weight of the aromatic vinyl-cyanide vinyl based copolymer (B).

In an exemplary embodiment of the present invention, the (meth)acrylic acid alkyl ester-based polymer (A) can be formed by polymerizing a mixture comprising a (meth) acrylic acid alkyl ester, an unsaturated carboxylic acid or its anhydride, and a compound having two or more hydroxyl groups.

In an exemplary embodiment of the present invention, the (meth)acrylic acid alkyl ester-based polymer (A) comprises chains comprising a (meth)acrylic acid alkyl ester unit and an unsaturated carboxylic acid or its anhydride unit, wherein the carboxylic acid group of the unsaturated carboxylic acid or its anhydride unit is linked to the hydroxyl groups of the compound having two or more hydroxyl groups by ester bonds.

In another exemplary embodiment of the present invention, the (meth)acrylic acid alkyl ester-based polymer (A) is formed by polymerizing a mixture comprising a (meth) acrylic acid alkyl ester, an unsaturated compound having a hydroxyl group, and a compound having two or more carboxyl groups.

In another exemplary embodiment of the present invention, the (meth)acrylic acid alkyl ester-based polymer (A) comprises chains comprising a (meth)acrylic acid alkyl ester unit and an unsaturated compound unit having a hydroxyl group, wherein the hydroxyl group of the unsaturated compound unit having a hydroxyl group is linked to the carboxyl groups of the compound having two or more carboxyl groups by ester bonds.

In an exemplary embodiment of the present invention, the aromatic vinyl-cyanide vinyl based copolymer (B) is formed by polymerizing about 60 to about 95% by weight of an aromatic vinyl-based compound, about 5 to about 40% by weight of a vinyl cyanide based compound, and about 0 to about 10% by weight of a (meth)acrylic acid alkyl ester. The aromatic vinyl-cyanide vinyl based copolymer (B) can have a weight-average molecular weight of about 150,000 to about 300,000.

A thermoplastic resin according to an exemplary embodiment of the present invention can have a gloss value of about 30 or less, measured using a 75 Degree Gloss Meter.

A method of preparing a thermoplastic resin according to one exemplary embodiment of the present invention comprises the steps of successively injecting a first monomer mixture comprising a (meth)acrylic acid alkyl ester and an unsaturated carboxylic acid or its anhydride into a first reactor among plural reactors connected to each other in series to polymerize the first monomer mixture; and successively injecting the polymer polymerized in the first reactor, a second monomer mixture comprising an aromatic vinyl-based compound and a vinyl cyanide based compound, and a compound having two or more hydroxyl groups into a second reactor to polymerize them.

A method of preparing a thermoplastic resin according to another exemplary embodiment of the present invention comprises the steps of successively injecting a first monomer mixture comprising a (meth)acrylic acid alkyl ester and an unsaturated compound having a hydroxyl group into a first reactor among plural reactors connected to each other in series to polymerize the first monomer mixture; and successively injecting the polymer polymerized in the first reactor, a second monomer mixture comprising an aromatic vinyl-based compound and a vinyl cyanide based compound, and a compound having two or more carboxyl groups into a second reactor to polymerize them.

The polymerization conversion ratio into the polymer in the first reactor can be about 85% to about 95%, and the final polymerization conversion ratio into the thermoplastic resin in a final reactor can be about 50% to about 70%.

Hereinafter, specific descriptions of the present invention will be discussed in detail below.

BRIEF DESCRIPTION OF THE DRAWINGS

FIGS. 1 (a) to (f) are transmission electron microscopy (TEM) images of thermoplastic resins prepared according to Examples 1 to 6;

FIGS. 2 (a) to (d) are TEM images of thermoplastic resins prepared according to Examples 7 to 10;

FIGS. 3 (a) to (c) are TEM images of thermoplastic resins prepared according to Comparative Examples 1 to 3; and FIGS. 4 (a) and (b) are TEM images of thermoplastic resins prepared according to Comparative Examples 5 to 6.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Weather Resistant Thermoplastic Resin Having Excellent Low Gloss Characteristics A weather resistant thermoplastic resin having excellent low gloss characteristics according to an exemplary embodiment of the present invention comprises a (meth)acrylic acid alkyl ester-based polymer (A) and an aromatic vinyl-cyanide vinyl based copolymer (B).

The thermoplastic resin can include about 5 to about 35% by weight of the (meth)acrylic acid alkyl ester-based polymer (A) and about 65 to about 95% by weight of the aromatic vinyl-cyanide vinyl based copolymer (B). As another example, the thermoplastic resin can include about 5 to about 25% by weight of the (meth)acrylic acid alkyl ester-based polymer (A) and about 75 to about 95% by weight of the aromatic vinyl-cyanide vinyl based copolymer (B). If the amount of the (meth)acrylic acid alkyl ester-based polymer (A) is less than about 5% by weight or more than about 35% by weight, it can be difficult to obtain a weather resistant thermoplastic resin having excellent low gloss characteristics.

The (meth)acrylic acid alkyl ester-based polymer (A) forms a disperse phase in the thermoplastic resin, and the aromatic vinyl-cyanide vinyl based copolymer (B) forms a continuous phase in the thermoplastic resin. As illustrated in FIGS. 1 (a) to (f) and FIGS. 2 (a) to (d), the (meth)acrylic acid alkyl ester-based polymer (A) can be partially or entirely in the form of a network-shaped disperse phase, and the aromatic vinyl-cyanide vinyl based copolymer (B) can form a continuous phase. If the (meth)acrylic acid alkyl ester-based polymer (A) is not formed in a network-shaped disperse phase, it can be difficult for the thermoplastic resin to obtain excellent low gloss characteristics, impact resistance and the like.

In one exemplary embodiment of the present invention, the (meth)acrylic acid alkyl ester-based polymer (A) formed in a disperse phase in the thermoplastic resin is formed by polymerizing a mixture comprising a (meth)acrylic acid alkyl ester, an unsaturated carboxylic acid or its anhydride, and a compound having two or more hydroxyl groups.

The (meth)acrylic acid alkyl ester and unsaturated carboxylic acid or its anhydride can be polymerized to form chains of the (meth)acrylic acid alkyl ester-based polymer (A) comprising a (meth)acrylic acid alkyl ester unit and an unsaturated carboxylic acid or its anhydride unit. A carboxyl group of the unsaturated carboxylic acid or its anhydride unit is linked to the hydroxyl groups of the compound having two or more hydroxyl groups by ester bonds. Accordingly, the chains of the (meth)acrylic acid alkyl ester-based polymer (A) are linked to each other to form a network-shaped disperse phase.

The (meth)acrylic acid alkyl ester-based polymer (A) may also be formed by polymerizing a mixture comprising an aromatic vinyl-based compound and a vinyl cyanide based compound together with a (meth)acrylic acid alkyl ester, an unsaturated carboxylic acid or its anhydride, and a compound having two or more hydroxyl groups.

If the aromatic vinyl-based compound and vinyl cyanide based compound are polymerized together with a (meth)acrylic acid alkyl ester, an unsaturated carboxylic acid or its anhydride, and a compound having two or more hydroxyl groups, chains of the (meth)acrylic acid alkyl ester-based polymer (A) may comprise a (meth)acrylic acid alkyl ester unit, an unsaturated carboxylic acid or its anhydride unit, an aromatic vinyl-based compound unit, and a vinyl cyanide based compound unit. As described above, the chains of the (meth)acrylic acid alkyl ester-based polymer (A) are linked to each other to form a network-shaped disperse phase by ester bonds of the carboxyl group in the chains and the hydroxyl groups of the compound having two or more of hydroxyl groups.

As mentioned above, at least a portion of the (meth)acrylic acid alkyl ester-based polymer (A) is formed in a network-shaped disperse phase. FIGS. 1 (a) and (e) demonstrate high levels of the network-shaped disperse phase.

As illustrated in FIGS. 1 (a) to (f) and FIGS. 2 (a) to (d), the (meth)acrylic acid alkyl ester-based polymer (A) can be partially or entirely formed in a network-shaped disperse phase.

In one exemplary embodiment of the present invention, the (meth)acrylic acid alkyl ester-based polymer (A) can be formed by polymerizing about 60 to about 95% by weight of a (meth)acrylic acid alkyl ester, about 1 to about 20% by weight of an unsaturated carboxylic acid or its anhydride, about 0 to about 20% by weight of an aromatic vinyl-based compound, about 0 to about 10% by weight of a vinyl cyanide based compound, and a compound having two or more hydroxyl groups of an equivalent ratio of about 0.1 to about 3 with respect to the unsaturated carboxylic acid or its anhydride (which can also be described as including the compound having two or more hydroxyl groups in an equivalent ratio of about 0.1 to about 3 based on the unsaturated carboxylic acid or its anhydride). If the amounts of the respective components are outside the above ranges, it can be difficult to provide a thermoplastic resin with sufficient weatherability or low gloss characteristics.

In particular, if the compound having two or more hydroxyl groups has an equivalent ratio of less than about 0.1 with respect to the unsaturated carboxylic acid or its anhydride, it can be difficult to form a network-shaped disperse phase since links between the chains of the polymer (A) may be insufficient. Further, thermal resistance may be rapidly deteriorated if the compound having two or more hydroxyl groups has an equivalent ratio of more than about 3 because excess amounts of the compound having two or more hydroxyl groups which do not participate in the reaction can function as a plasticizer in the continuous phase.

As another example, the (meth)acrylic acid alkyl ester-based polymer (A) can be formed by polymerizing about 75 to about 95% by weight of a (meth)acrylic acid alkyl ester, about 1 to about 10% by weight of an unsaturated carboxylic acid or its anhydride, about 1 to about 10% by weight of an aromatic vinyl-based compound, about 1 to about 8% by weight of a vinyl cyanide based compound, and a compound having two or more hydroxyl groups of an equivalent ratio of about 0.1 to about 2.5 with respect to the unsaturated carboxylic acid or its anhydride.

As another example, the (meth)acrylic acid alkyl ester-based polymer (A) can be formed by polymerizing about 80 to about 95% by weight of a (meth)acrylic acid alkyl ester, about 1 to about 5% by weight of an unsaturated carboxylic acid or its anhydride, about 2 to about 8% by weight of an aromatic vinyl-based compound, about 1 to about 5% by weight of a vinyl cyanide based compound, and a compound having two or more hydroxyl groups of an equivalent ratio of about 0.5 to about 2.0 with respect to the unsaturated carboxylic acid or its anhydride.

The (meth)acrylic acid alkyl ester of the (meth)acrylic acid alkyl ester-based polymer (A) can be a (meth)acrylic acid alkyl ester having a C1 to C10 alkyl group. Examples of the (meth)acrylic acid alkyl ester may comprise, but are not limited to, methyl methacrylate, ethyl methacrylate, propyl methacrylate, butyl methacrylate, pentyl methacrylate, hexyl methacrylate, heptyl methacrylate, octyl methacrylate, methyl acrylate, ethyl acrylate, propyl acrylate, butyl acrylate, pentyl acrylate, hexyl acrylate, heptyl acrylate, octyl acrylate, and the like. The (meth)acrylic acid alkyl ester may be employed singly or in the form of combinations of two or more thereof.

Examples of the aromatic vinyl-based compound may comprise, but are not limited to, styrene, α-methyl styrene, para-methyl styrene, and the like. The aromatic vinyl-based compound may be employed singly or in the form of combinations of two or more thereof.

Examples of the vinyl cyanide based compound may comprise, but are not limited to, acrylonitrile, methacrylonitrile, ethacrylonitrile, and the like. The vinyl cyanide based compound may be employed singly or in the form of combinations of two or more thereof.

The unsaturated carboxylic acid or its anhydride is a carboxylic acid or carboxylic acid anhydride having a double bond of carbon atoms within a molecule thereof. Examples of the unsaturated carboxylic acid or its anhydride may comprise, but are not limited to, acrylic acid, methacrylic acid, maleic acid, maleic anhydride, fumaric acid, fumaric anhydride, and the like. The unsaturated carboxylic acid or its anhydride may be employed singly or in the form of combinations of two or more thereof.

The compound having two or more hydroxyl groups can have 2 to 10 hydroxyl groups, and as another example 2 to 5 hydroxyl groups. Further, the compound having two or more hydroxyl groups can be a saturated compound in which its all carbon atoms within a molecule thereof are bonded by single bonds only. Examples of the compound having two or more hydroxyl groups may comprise without limitation C2 to C10 alkanediols, ethylene glycol, polyethylene glycols, propylene glycol, polypropylene glycols, polyols and the like. The compound having two or more hydroxyl groups may be employed singly or in the form of combinations of two or more thereof.

Examples of the alkanediols with 2 to 10 carbon atoms may comprise, but are not limited to, 1,4-butandiol, 1,5-pentandiol, 1,6-hexandiol, 1,7-heptandiol, 1,8-octandiol and the like. Examples of the polyethylene glycols may comprise, but are not limited to, PEG300, PEG600, PEG1500 and the like depending on molecular weight thereof. Examples of the polyols may comprise, but are not limited to, xylitol, glycerin, erythritol, sorbitol, acrylic- or ester-based polyols having a hydroxyl value of about 50 to about 500 and a weight average molecular weight of about 500 to about 5,000, and the like.

In another exemplary embodiment of the present invention, the (meth)acrylic acid alkyl ester-based polymer (A) formed in a disperse phase in the thermoplastic resin is formed by polymerizing a mixture comprising a (meth)acrylic acid alkyl ester, an unsaturated compound having a hydroxyl group, and a compound having two or more carboxyl groups.

The (meth)acrylic acid alkyl ester and the unsaturated compound having a hydroxyl group can be polymerized to form chains of the (meth)acrylic acid alkyl ester-based polymer (A) comprising the (meth)acrylic acid alkyl ester unit and the unsaturated compound unit having a hydroxyl group. The hydroxyl group of the unsaturated compound unit having a hydroxyl group is linked to the carboxyl groups of the compound having two or more carboxyl groups by ester bonds. Accordingly, the chains of the (meth)acrylic acid alkyl ester-based polymer (A) are linked to each other to form a network-shaped disperse phase.

Accordingly, in the various embodiments of the present invention, the chains of the (meth)acrylic acid alkyl ester-based polymer (A) are linked to each other by ester bonds to form a network shape. As discussed herein, in one embodiment of the present invention, the unsaturated carboxyl compound or its anhydride forms a part of a repeating unit of the chains of polymer (A), and the compound having two or more hydroxyl groups serves to link the chains of the polymer (A). In the other embodiment of the present invention, the unsaturated compound having a hydroxyl group forms a part of the repeating unit of the chains of polymer (A), and the compound having two or more carboxyl groups links the chains of the polymer (A).

In a further exemplary embodiment of the present invention, the (meth)acrylic acid alkyl ester-based polymer (A) may be formed by polymerizing an aromatic vinyl-based compound and a vinyl cyanide based compound together with a (meth)acrylic acid alkyl ester, an unsaturated compound unit having a hydroxyl group, and a compound having two or more carboxyl groups.

When the aromatic vinyl-based compound and the vinyl cyanide based compound are polymerized together with a (meth)acrylic acid alkyl ester, an unsaturated compound unit having a hydroxyl group, and a compound having two or more carboxyl groups, the chains of the (meth)acrylic acid alkyl ester-based polymer (A) may comprise a (meth)acrylic acid alkyl ester unit, an unsaturated compound unit having a hydroxyl group, an aromatic vinyl-based compound unit, and a vinyl cyanide based compound unit. As described above, the chains of the polymer (A) are linked to each other to form a network-shaped disperse phase by ester bonds of the hydroxyl group comprised in the chains and the carboxyl groups comprised in the compound having two or more carboxyl groups.

In a still further exemplary embodiment of the present invention, the (meth)acrylic acid alkyl ester-based polymer (A) can be formed by polymerizing about 60 to about 95% by weight of a (meth)acrylic acid alkyl ester, about 1 to about 20% by weight of an unsaturated compound having a hydroxyl group, about 0 to about 20% by weight of an aromatic vinyl-based compound, about 0 to about 10% by weight of a vinyl cyanide based compound, and a compound having two or more carboxyl groups of an equivalent ratio of about 0.1 to about 3 with respect to the unsaturated compound having a hydroxyl group (which can also be described as including the compound having two or more carboxyl groups in an equivalent ratio of about 0.1 to about 3 based on the unsaturated compound having a hydroxyl group). If amounts of the respective components are outside the above ranges, it can be difficult to provide a thermoplastic resin with sufficient weatherability or low gloss characteristics.

In particular, if the compound having two or more carboxyl groups has an equivalent ratio of less than about 0.1 with respect to the unsaturated compound having a hydroxyl group, it can be difficult to form a network-shaped disperse phase since links between the chains of the polymer (A) may be insufficient. Further, thermal resistance may be rapidly deteriorated if the compound having two or more carboxyl groups has an equivalent ratio of more than about 3 because excess amounts of the compound having two or more carboxyl groups which do not participate in the reaction can function as a plasticizer in the continuous phase.

As another example, the (meth)acrylic acid alkyl ester-based polymer (A) can be formed by polymerizing about 75 to about 95% by weight of a (meth)acrylic acid alkyl ester, about 1 to about 10% by weight of an unsaturated compound having a hydroxyl group, about 1 to about 10% by weight of an aromatic vinyl-based compound, about 1 to about 8% by weight of a vinyl cyanide based compound, and a compound having two or more carboxyl groups of an equivalent ratio of about 0.1 to about 2.5 with respect to the unsaturated compound having a hydroxyl group.

As another example, the (meth)acrylic acid alkyl ester-based polymer (A) can be formed by polymerizing about 80 to about 95% by weight of a (meth)acrylic acid alkyl ester, about 1 to about 5% by weight of an unsaturated compound having a hydroxyl group, about 2 to about 8% by weight of an (meth)acrylic acid alkyl ester, about 1 to about 5% by weight of a vinyl cyanide based compound, and a compound having two or more carboxyl groups of an equivalent ratio of about 0.5 to about 2.0 with respect to the unsaturated compound having a hydroxyl group.

In these embodiments, the (meth)acrylic acid alkyl ester, the aromatic vinyl-based compound, and the vinyl cyanide based compound can be the same as those mentioned above.

The unsaturated compound having a hydroxyl group can be a compound which has double bonds or triple bonds of carbon atoms within a molecule thereof and also has a hydroxyl group. Examples of the unsaturated compound having a hydroxyl group may comprise, but are not limited to, hydroxyalkyl acrylates, hydroxyalkyl methacrylates and combinations thereof. The hydroxyalkyl acrylates and hydroxyalkyl methacrylates can have an alkyl group of 1 to 10 carbon atoms. Specific examples of the hydroxyalkyl acrylate and hydroxyalkyl methacrylate may comprise without limitation 2-hydroxyethyl acrylate, 2-hydroxyethyl methacrylate, and the like, and combinations thereof.

The compound having two or more carboxyl groups can have 2 to 10 carboxyl groups, and as another example 2 to 5 carboxyl groups. The compound having two or more carboxyl groups can be a saturated compound in which all carbon atoms within a molecule thereof are bonded in a single bond. Examples of the compound having two or more carboxyl groups may comprise without limitation C2 to C10 alkanedioic acids, polyacids, and the like, and combinations thereof.

Examples of the C2 to C10 alkanedioic acids may comprise, but are not limited to, butanedioic acid (succinic acid), pentanedioic acid (glutaric acid), hexanedioic acid (adipic acid), heptanedioic acid (pimelic acid), octanedioic acid (sueric acid), nonanedioic acid (azelaic acid), decanedioic acid (sebacic acid) and the like, and combinations thereof.

The polyacid can have an acid value of about 30 to about 300 and a weight average molecular weight of about 1,000 to about 5,000. Exemplary polyacids may comprise, but are not limited to, poly(meth)acrylic acids, styrene-(meth)acrylic acid polymers, styrene-maleic acid polymers and the like, and combinations thereof. For example, the polyacid can be Morez-101 of Rohm and Hass Corporation, Joncryl-678 and Joncryl-690 of BASF Corporation, Soluryl-20 and Soluryl-70 of Hanwha Chemical Corporation and the like, and combinations thereof.

The aromatic vinyl-cyanide vinyl based copolymer (B) formed in a continuous phase in the thermoplastic resin according to the present invention is formed by polymerizing an aromatic vinyl-based compound and a vinyl cyanide based compound.

The aromatic vinyl-cyanide vinyl based copolymer (B) may be formed by polymerizing a (meth)acrylic acid alkyl ester together with the aromatic vinyl-based compound and vinyl cyanide based compound.

For example, the aromatic vinyl-cyanide vinyl based copolymer (B) can be formed by polymerizing about 60 to about 95% by weight of an aromatic vinyl-based compound, about 5 to about 40% by weight of a vinyl cyanide based compound, and about 0 to about 10% by weight of a (meth) acrylic acid alkyl ester. If the amounts of the respective components are outside of the above ranges, the basic physical properties of the thermoplastic resin including impact resistance, yellowness, flow characteristics and the like may rapidly change.

As another example, the aromatic vinyl-cyanide vinyl based copolymer (B) can be formed by polymerizing about 60 to about 84% by weight of an aromatic vinyl-based compound, about 15 to about 35% by weight of a vinyl cyanide based compound, and about 1 to about 5% by weight of a (meth)acrylic acid alkyl ester.

Examples of the aromatic vinyl-based compound forming the aromatic vinyl-cyanide vinyl based copolymer (B) may comprise, but are not limited to, styrene, α-methyl styrene, para-methyl styrene and the like. The aromatic vinyl-based compound may be employed singly or in the form of combinations of two or more thereof. Examples of the vinyl cyanide based compound used in the aromatic vinyl-cyanide vinyl based copolymer (B) may comprise, but are not limited to, acrylonitrile, methacrylonitrile, ethacrylonitrile and the like. The vinyl cyanide based compound may be employed singly or in the form of combinations of two or more thereof.

The (meth)acrylic acid alkyl ester forming the aromatic vinyl-cyanide vinyl based copolymer (B) can be a (meth) acrylic acid alkyl ester having an alkyl group of 1 to 10 carbon atoms. Examples of the (meth)acrylic acid alkyl ester may comprise, but are not limited to, methyl methacrylate, ethyl methacrylate, propyl methacrylate, butyl methacrylate, pentyl methacrylate, hexyl methacrylate, heptyl methacrylate, octyl methacrylate, methyl acrylate, ethyl acrylate, propyl acrylate, butyl acrylate, pentyl acrylate, hexyl acrylate, heptyl acrylate, octyl acrylate, and the like. The (meth)acrylic acid alkyl ester may be employed singly or in the form of combinations of two or more thereof.

The aromatic vinyl-cyanide vinyl based copolymer (B) can have a weight-average molecular weight of about 150,000 to about 300,000, for example about 180,000 to about 250,000. If the weight-average molecular weight in the continuous phase is less than about 150,000, rapid deterioration in impact strength and delamination may occur since the size of the disperse phase of the aromatic vinyl-cyanide vinyl based copolymer (B) can excessively increase. On the other hand, if the weight-average molecular weight in the continuous phase is more than about 300,000, the low gloss characteristics may deteriorate since the size of the disperse phase of the aromatic vinyl-cyanide vinyl based copolymer (B) can excessively decrease.

The thermoplastic resin according to the present invention can be prepared by continuous bulk polymerization. It is difficult to prepare the aforementioned network-shaped disperse phase using methods generally used to prepare a rubber phase, such as an emulsion polymerization method, a suspension polymerization method and the like. Further, using conventional methods, the final product should be prepared by methods such as melt extrusion and the like after separately preparing an aromatic vinyl-cyanide vinyl based copolymer formed in a continuous phase. Therefore, such methods make it difficult to efficiently prepare a weather resistant thermoplastic resin having excellent low gloss characteristics.

A thermoplastic resin of the present invention can have very excellent low gloss characteristics compared to conventional weather resistant thermoplastic resins. The thermoplastic resin can have a gloss value of about 30 or less, for example about 21 or less, which is measured using a 75 Degree Gloss Meter.

A thermoplastic resin according to the present invention has excellent low gloss characteristics while maintaining basic physical properties of a weather resistant thermoplastic resin such as excellent flow characteristics, impact strength, thermal resistance, and transparency. Therefore, the thermoplastic resin may be widely used in electric and electronic components, materials for farm machines and implements, road signboards, finishing materials for building, door panels, window frames, leisure/household goods, sports goods, automobile supplies, and the like requiring both weatherability and low gloss characteristics.

Examples of a method of molding a thermoplastic resin according to the present invention to manufacture the aforementioned products may comprise, but not be limited to, extrusion, injection, casting and the like, which are widely used. A molding method may be easily performed by those skilled in the art.

Method of Preparing Thermoplastic Resin Having Excellent Low Gloss Characteristics The present invention provides a method of preparing the aforementioned weather resistant thermoplastic resin having excellent low gloss characteristics.

A preparation method according to one exemplary embodiment of the present invention comprises the steps of successively injecting a first monomer mixture comprising a (meth)acrylic acid alkyl ester and an unsaturated carboxylic acid or its anhydride into a first reactor among plural reactors connected to each other in series to polymerize the first monomer mixture; and successively injecting the polymer polymerized in the first reactor, a second monomer mixture comprising an aromatic vinyl-based compound and a vinyl cyanide based compound, and a compound having two or more hydroxyl groups into a second reactor to polymerize them.

Specifically, a (meth)acrylic acid alkyl ester and an unsaturated carboxylic acid or its anhydride are first mixed to prepare a first monomer mixture. The polymer is then prepared by successively injecting the first monomer mixture into the first reactor among plural reactors connected to each other in series and polymerizing the first monomer mixture.

The first monomer mixture may further optionally comprise an aromatic vinyl-based compound and a vinyl cyanide based compound.

For example, the first monomer mixture can comprise about 60 to about 95% by weight of a (meth)acrylic acid alkyl ester, about 1 to about 20% by weight of an unsaturated carboxylic acid or its anhydride, about 0 to about 20% by weight of an aromatic vinyl-based compound, and about 0 to about 10% by weight of a vinyl cyanide based compound. If the amounts of the respective components in the first monomer mixture are outside of the above ranges, it can be difficult to provide a thermoplastic resin finally prepared with sufficient weatherability or low gloss characteristics.

As another example, the first monomer mixture can comprise about 70 to about 95% by weight of a (meth)acrylic acid alkyl ester, about 1 to about 10% by weight of an unsaturated carboxylic acid or its anhydride, about 1 to about 10% by weight of an aromatic vinyl-based compound, and about 1 to about 8% by weight of a vinyl cyanide based compound. As another example, the first monomer mixture can comprise about 80 to about 95% by weight of a (meth)acrylic acid alkyl ester, about 1 to about 5% by weight of an unsaturated carboxylic acid or its anhydride, about 2 to about 8% by weight of an aromatic vinyl-based compound, and about 1 to about 5% by weight of a vinyl cyanide based compound.

The (meth)acrylic acid alkyl ester and the unsaturated carboxylic acid or its anhydride comprised in the first monomer mixture form chains of the (meth)acrylic acid alkyl ester-based polymer (A) through the polymerization reaction in the first reactor. Additionally, when the first monomer mixture further comprises the aromatic vinyl-based compound and the vinyl cyanide based compound, the chains of the polymer (A) further comprise an aromatic vinyl-based compound unit and a vinyl cyanide based compound unit.

The polymer prepared from the first monomer mixture in the first reactor is successively injected into the second reactor, and at the same time, a second monomer mixture comprising the aromatic vinyl-based compound and the vinyl cyanide based compound and the compound having two or more hydroxyl groups are successively injected into the second reactor. Then, the polymer, the second monomer mixture and the compound having two or more hydroxyl groups are polymerized in the second reactor.

The second monomer mixture may further optionally comprise a (meth)acrylic acid alkyl ester.

For example, the second monomer mixture can comprise about 60 to about 95% by weight of an aromatic vinyl-based compound, about 5 to about 40% by weight of a vinyl cyanide based compound, and about 0 to about 10% by weight of a (meth)acrylic acid alkyl ester. If amounts of the respective components the second monomer mixture are outside of the above amounts, the basic physical properties of the thermoplastic resin including impact resistance, yellowness, flow characteristics and the like may rapidly change.

As another example, the aromatic vinyl-cyanide vinyl based copolymer (B) can comprise about 60 to about 84% by weight of an aromatic vinyl-based compound, about 15 to about 35% by weight of a vinyl cyanide based compound, and about 1 to about 5% by weight of a (meth)acrylic acid alkyl ester.

The polymer polymerized in the first reactor reacts with the compound having two or more hydroxyl groups in the second reactor to form a network-shaped disperse phase. Specifically, a carboxyl group existing in an unsaturated carboxylic acid or its anhydride unit comprising a unit of the chains of the polymer polymerized in the first reactor is linked to the hydroxyl groups existing in the compound having two or more hydroxyl groups by ester bonds. Stated differently, a carboxyl group of the unsaturated carboxylic acid or its anhydride comprising a unit of the chain of the polymer polymerized in the first reactor reacts with a hydroxyl group of the compound having two or more hydroxyl groups to form ester bonds to thereby link chains of the polymer polymerized in the first reactor. Accordingly, as illustrated in FIGS. 1 (a) to (f), chains of the polymer (A) are connected to one another to form a network-shaped disperse phase and reveal excellent low gloss characteristics. Further, the second monomer mixture comprising the aromatic vinyl-based compound, the vinyl cyanide based compound, and optionally the (meth)acrylic acid alkyl ester is polymerized in the second reactor to form a continuous phase.

A preparation method according to another exemplary embodiment of the present invention comprises the steps of successively injecting a first monomer mixture comprising a (meth)acrylic acid alkyl ester and an unsaturated compound having a hydroxyl group into a first reactor among plural reactors connected to each other in series to polymerize the first monomer mixture; and successively injecting the polymer polymerized in the first reactor, a second monomer mixture comprising an aromatic vinyl-based compound and a vinyl cyanide based compound, and a compound having two or more carboxyl groups into a second reactor to polymerize them.

Specifically, a (meth)acrylic acid alkyl ester and an unsaturated compound having a hydroxyl group are first mixed to prepare a first monomer mixture. The polymer is then prepared by successively injecting the first monomer mixture into the first reactor among plural reactors connected to each other in series and polymerizing the first monomer mixture.

The first monomer mixture may further optionally comprise an aromatic vinyl-based compound and a vinyl cyanide based compound.

For example, the first monomer mixture can comprise about 60 to about 95% by weight of a (meth)acrylic acid alkyl ester, about 1 to about 20% by weight of an unsaturated compound having a hydroxyl group, about 0 to about 20% by weight of an aromatic vinyl-based compound, and about 0 to about 10% by weight of a vinyl cyanide based compound. If the amounts of the respective components of the first monomer mixture are outside of the above ranges, the thermoplastic resin finally prepared may not have sufficient weatherability or low gloss characteristics.

As another example, the first monomer mixture can comprise about 70 to about 95% by weight of a (meth)acrylic acid alkyl ester, about 1 to about 10% by weight of an unsaturated compound having a hydroxyl group, about 1 to about 10% by weight of an aromatic vinyl-based compound, and about 1 to about 8% by weight of a vinyl cyanide based compound. As another example, the first monomer mixture can comprise about 80 to about 95% by weight of a (meth)acrylic acid alkyl ester, about 1 to about 5% by weight of an unsaturated compound having a hydroxyl group, about 2 to about 8% by weight of an aromatic vinyl-based compound, and about 1 to about 5% by weight of a vinyl cyanide based compound.

The (meth)acrylic acid alkyl ester and the unsaturated compound having a hydroxyl group comprised in the first monomer mixture form chains of the (meth)acrylic acid alkyl ester-based polymer (A) through the polymerization reaction in the first reactor.

Additionally, when the first monomer mixture further comprises the aromatic vinyl-based compound and vinyl cyanide based compound, the chains of the polymer (A) further comprise an aromatic vinyl-based compound unit and a vinyl cyanide based compound unit.

The polymer is prepared from the first monomer mixture in the first reactor is successively injected into the second reactor, and at the same time, the second monomer mixture comprising the aromatic vinyl-based compound and the vinyl cyanide based compound and the compound having two or more carboxyl groups are successively injected into the second reactor. Then, the polymer, the second monomer mixture and the compound having two or more carboxyl groups are polymerized in the second reactor.

The second monomer mixture may further optionally comprise a (meth)acrylic acid alkyl ester.

For example, the second monomer mixture can comprise about 60 to about 95% by weight of an aromatic vinyl-based compound, about 5 to about 40% by weight of a vinyl cyanide based compound, and about 0 to about 10% by weight of a (meth)acrylic acid alkyl ester. If amounts of the respective components of the second monomer mixture are outside of the above ranges, the physical properties of the thermoplastic resin including impact resistance, yellowness, flow characteristics and the like may rapidly change.

As another example, the aromatic vinyl-cyanide vinyl based copolymer (B) can comprise about 60 to about 84% by weight of an aromatic vinyl-based compound, about 15 to about 35% by weight of a vinyl cyanide based compound, and about 1 to about 5% by weight of a (meth)acrylic acid alkyl ester.

The polymer polymerized in the first reactor reacts with the compound having two or more carboxyl groups in the second reactor to form a network-shaped disperse phase. Specifically, a hydroxyl group existing in an unsaturated compound having a hydroxyl group comprising a unit of the chains of the polymer polymerized in the first reactor is linked to the carboxyl groups existing in the compound having two or more carboxyl groups by ester bonds. Stated differently, a hydroxyl group of the unsaturated compound having a hydroxyl group comprising a unit of the chain of the polymer polymerized in the first reactor reacts with a carboxyl group of the compound having two or more carboxyl groups to form ester bonds to thereby link chains of the polymer polymerized in the first reactor. Accordingly, as illustrated in FIGS. 2 (a) to (d), chains of the polymer (A) are connected to one another to form a network-shaped disperse phase and reveal excellent low gloss characteristics. Further, the second monomer mixture comprising the aromatic vinyl-based compound, the vinyl cyanide based compound and optionally the (meth) acrylic acid alkyl ester is polymerized in the second reactor to form a continuous phase.

The (meth)acrylic acid alkyl ester, the unsaturated carboxylic acid or its anhydride, the unsaturated compound having a hydroxyl group, the aromatic vinyl-based compound, and the vinyl cyanide based compound injected into the first reactor are the same as those described above with regard to the (meth)acrylic acid alkyl ester-based polymer (A) of the thermoplastic resin.

Also, the aromatic vinyl-based compound and the vinyl cyanide based compound injected into the second reactor are the same as those described above with regard to the aromatic vinyl-cyanide vinyl based copolymer (B) of the thermoplastic resin, and the compound having two or more hydroxyl groups and the compound having two or more carboxyl groups are the same as those described above with regard to the (meth) acrylic acid alkyl ester-based polymer (A) of the thermoplastic resin.

In the exemplary embodiments of the present invention, the polymerization conversion ratio of the polymer in the first reactor can be about 85% to about 95%, and as another example about 90 to about 95%. If the polymerization conversion ratio into the polymer in the first reactor is less than about 85%, it can be difficult to form a network-shaped disperse phase in the subsequent reaction since a large amount of non-reacted material remains. If the polymerization conversion ratio into the polymer in the first reactor is more than about 95%, the polymerization time is long and the preparation cost increases, which is not desirable.

In the exemplary embodiments of the present invention, the first monomer mixture together with an initiator can be injected into the first reactor and polymerized in the first reactor. Optionally, a solvent and a molecular weight regulator may additionally be used.

Furthermore, the second monomer mixture together with an initiator can also be injected into the second reactor and polymerized therein. Optionally, a solvent and a molecular weight regulator may additionally be used.

In the first reactor, about 5 to about 200 parts by weight of the solvent, about 0.1 to about 0.4 parts by weight of the initiator and about 0 to about 0.2 parts by weight of the molecular weight regulator, each based on about 100 parts by weight of the first monomer mixture, can be injected.

In the second reactor, about 0 to about 20 parts by weight of the solvent, about 0.01 to about 0.05 parts by weight of the initiator and about 0 to about 0.5 parts by weight of the molecular weight regulator, each based on about 100 parts by weight of the first monomer mixture, can be injected.

Examples of the solvent may comprise, but are not limited to, ethyl benzene, xylene, toluene, methyl ethyl ketone and the like. The solvent may be employed singly or in the form of combinations of two or more thereof. The solvent may be used for effective heat transfer and agitation of reactants in the polymerization process.

Examples of the initiator may comprise, but are not limited to, azobis isobutyronitrile, benzoyl peroxide, 1,1-bis(t-butylperoxy)-2-methylcyclohexane, 1,1-bis(t-butylperoxy)cyclohexane, 2-bis(4,4-di-t-butylperoxy cyclohexane)propane, t-hexyl peroxy isopropyl monocarbonate, t-butyl peroxy maleic acid, t-butyl peroxy-3,5,5-trimethyl hexanoate, t-butyl peroxy laurate, 2,5-dimethyl-2,5-bis(m-toluoyl peroxy) hexane, t-butyl peroxy isopropyl monocarbonate, t-butyl peroxy-2-ethylhexyl monocarbonate, t-hexyl peroxybenzoate, 2,5-dimethyl-2,5-bis(benzoyl peroxy)hexane, t-butyl peroxyacetate, 2,2-bis(t-butyl peroxy)butane, t-butyl peroxybenzoate, n-butyl-4,4-bis(t-butyl peroxy)valerate, and the like, and combinations thereof.

Examples of the molecular weight regulator may comprise, but are not limited to, t-dodecyl mercaptan, n-dodecyl mercaptan and the like, and combinations thereof. The molecular weight regulator serves to regulate the molecular weight of a disperse phase.

In exemplary embodiments of the present invention, the reaction temperature of the first reactor can range from about 60 to about 120° C., and as another example about 70 to about 100° C. Further, the residence time in the first reactor can range from about 6 to about 10 hours, and as another example about 7 to about 9 hours.

The reaction temperature of the second reactor can range from about 90 to about 130° C., and as another example about 100 to about 120° C. Further, the residence time in the second reactor can range from about 1 to about 4 hours, and as another example about 1 to about 3 hours.

In one exemplary embodiment of the present invention, the flow rate can be controlled so that a reactant injected into the second reactor includes about 5 to about 15% by weight of the polymer polymerized in the first reactor and about 85 to about 95% by weight of the total of the second monomer mixture and the compound having two or more hydroxyl groups.

In another exemplary embodiment of the present invention, the flow rate can be controlled so that a reactant injected into the second reactor includes about 5 to about 15% by weight of the polymer polymerized in the first reactor and about 85 to about 95% by weight of the total of the second monomer mixture and the compound having two or more carboxyl groups.

If a composition for the reactant injected into the second reactor is controlled as mentioned above, a thermoplastic resin comprising about 5 to about 35% by weight of a (meth) acrylic acid alkyl ester-based polymer (A) and about 65 to about 95% by weight of an aromatic vinyl-cyanide vinyl based copolymer (B) may be prepared.

In one exemplary embodiment of the present invention, the compound having two or more hydroxyl groups injected into the second reactor can be injected in the equivalent ratio of about 0.1 to about 3, as another example about 0.1 to about 2.5, and as another example about 0.5 to about 2.0 with respect to the unsaturated carboxylic acid or its anhydride injected into the first reactor.

In another exemplary embodiment of the present invention, the compound having two or more carboxyl groups injected into the second reactor can be injected in the equivalent ratio of about 0.1 to about 3, as another example about 0.1 to about 2.5, and as another example about 0.5 to about 2.0 with respect to the unsaturated compound having a hydroxyl group injected into the first reactor.

If the compound having two or more hydroxyl groups is injected in an equivalent ratio of less than about 0.1 with respect to the unsaturated carboxylic acid or its anhydride, or the compound having two or more carboxyl groups is injected in an equivalent ratio of less than about 0.1 with respect to the unsaturated compound having a hydroxyl group, it can be difficult to form a network-shaped disperse phase since links between the chains of the (meth)acrylic acid alkyl ester-based polymer (A) are not sufficient. Also, if the compound having two or more hydroxyl groups or the compound having two or more carboxyl groups are injected in an equivalent ratio of more than about 3, thermal resistance may be rapidly deteriorated since excess of the compound having two or more hydroxyl groups or the compound having two or more carboxyl groups which do not participate in the reaction can function as a plasticizer in the continuous phase.

In the present invention, the plural reactors can include 2 to 5 reactors, and the polymerization reaction can be successively carried out through the respective reactors.

The final polymerization conversion ratio into a thermoplastic resin in a final reactor in which the polymerization is finished can be about 50 to about 70%, and as another example about 50 to about 65%. If the final polymerization conversion ratio is less than about 50%, the amount of the thermoplastic resin prepared per unit time decreases, which is not commercially useful. It may be difficult to control the reaction heat and transfer the polymer since viscosity of the polymer rapidly increases if the final polymerization conversion ratio is more than about 70%.

In a further exemplary embodiment of the present invention, the preparation method may further comprise the step of separating non-reacted material from the final polymer using a devolatilization vessel in a high temperature and vacuum state after preparing the final polymer including network-shaped disperse and continuous phases through the successive polymerization process in the plural reactors as mentioned above. Then, the prepared thermoplastic resin may be formed in the shape of pellets by using a pelletizer or the like.

The present invention will be well understood by the following examples. The following examples of the present invention are only for illustrative purposes and are not construed as being limited to the scope of the present invention defined by the appended claims.

EXAMPLES

Example 1

A first reactant is prepared by mixing about 100 parts by weight of toluene, about 0.2 parts by weight of benzoyl peroxide (BPO) and about 0.05 parts by weight of t-dodecyl mercaptan (TDM) with about 100 parts by weight of a first monomer mixture including about 90 parts by weight of butyl acrylate (BA), about 5 parts by weight of styrene (SM), about 2 parts by weight of acrylonitrile (AN) and about 3 parts by weight of acrylic acid (AA). A polymer is prepared by polymerizing the first reactant at a temperature of about 80° C. for a residence time of 8 hours after injecting the first reactant at a rate of about 1 kg/hr into a first reactor (R-1) of a continuous polymerization reactor having three reactors, which are connected to one another in series, and in which jackets are installed to easily control the reaction temperature. The polymerization conversion ratio is about 90%, and the polymer prepared in the first reactor (R-1) is successively injected into a second reactor (R-2) of the continuous polymerization reactor.

A second reactant is prepared by mixing about 10 parts by weight of toluene, about 0.02 parts by weight of 1,1-bis(t-butylperoxy)cyclohexane (PHX-C), about 0.1 parts by weight of t-dodecyl mercaptan (TDM) and about 1.47 parts by weight (an equivalent ratio of 1.0) of polyethylene glycol (PEG600) having a weight average molecular weight of about 600 with about 100 parts by weight of a second monomer mixture including about 72 parts by weight of styrene (SM), about 25 parts by weight of acrylonitrile (AN) and about 3 parts by weight of butyl acrylate (BA). A polymer is prepared by polymerizing the second reactant at a temperature of about 110° C. for a residence time of about 2 hours after injecting the second reactant at a rate of about 8.5 kg/hr into the second reactor (R-2) of the continuous polymerization reactor. The polymerization conversion ratio is about 25%.

The polymer prepared in the second reactor (R-2) is successively injected into a third reactor (R-3) of the continuous polymerization reactor to polymerize the prepared polymer at a temperature of about 130° C. for a residence time of about 2 hours. The polymerization conversion ratio is about 55%.

The flow index of the thermoplastic resin is measured after successively injecting the resulting polymer discharged from the third reactor (R-3) into a devolatilization vessel maintained at about 240° C. and about 20 Torr, removing non-reacted monomers and solvents from the resulting polymer, and obtaining a thermoplastic resin in the shape of pellets using a pelletizer. A weight-average molecular weight of a continuous phase of the thermoplastic resin and a content of a disperse phase therein are measured. Physical properties such as Izod impact strength, yellowness, Vicat softening point, and the like are measured from specimens for measuring physical properties, which are manufactured by injection molding the thermoplastic resin. In addition, physical properties such as gloss, delamination characteristics, falling ball impact strength, weatherability and the like are measured from an extruded sheet having a thickness of about 10 mm which is manufactured from the thermoplastic resin using a T-die of about 190° C. The measured results are reported in the following Table 1. FIG. 1 (a) is a TEM image of a weather resistant thermoplastic resin prepared according to Example 1.

Methods of Measuring Physical Properties:

(1) Flow index (g/10 min) of a specimen is measured in accordance with ASTM D-1238, under a condition of about 220° C./10 kg.

(2) Weight-average molecular weight: An elution curve of a specimen is obtained by using THF as a moving bed through a gel permeation chromatography (GPC) at room temperature, and a relative number-average molecular weight, a weight-average molecular weight and a molecular weight distribution of the specimen are calculated (by using a GPC, LF-804 column from Waters Corporation) based on the standard polystyrene polymer.

(3) Content (%) of disperse phase: The oxygen content in the thermoplastic resin is measured by using Flash EA 1112 from Thermo Finningan Corporation, and the content is calculated using molecular weight of an acrylate monomer.

(4) Izod impact strength (kgf·cm/cm) is measured in accordance with ASTM D256 under a ⅛" notched condition.

(5) Yellowness is measured in accordance with JIS K7105.

(6) Delamination characteristics of an extruded sheet are measured by giving a grade between one and five points depending on the degree of delamination after observing a surface state of the extruded sheet with the naked eye. Five points are given if delamination is not observed from the extruded sheet, and one point is given if delamination is observed all over the extruded sheet (Five points: highest grade, four points: higher grade, three points: medium grade, two points: lower grade, one point: lowest grade).

(7) Vicat softening point (° C.) of a specimen is measured in accordance with ISO R 306 under conditions of 5 kg and 50° C./HR.

(8) Gloss: 75 degree gloss is measured using a BYK-Gardner gloss meter.

(9) Falling ball impact strength (J) is measured in accordance with ASTM D4226.

(10) Weatherability: A ΔE value is measured in accordance with UL 746C.

(11) TEM image: A specimen is stained with RuO4 and OsO4 through two steps to observe the form of a disperse phase of the specimen.

Example 2

A thermoplastic resin is prepared by the same method as in Example 1 except that about 0.33 parts by weight (an equivalent ratio of 1.5) of 1,4-butandiol (1,4-BDO) is used instead of about 1.47 parts by weight (an equivalent ratio of 1.0) of polyethylene glycol (PEG600). Physical properties are measured by the same methods as in Example 1, and the measured results are reported in the following Table 1. Further, FIG. 1 (b) is a TEM image of the thermoplastic resin prepared according to Example 2.

Example 3

A thermoplastic resin is prepared by the same method as in Example 1 except that about 1.84 parts by weight (an equivalent ratio of 0.5) of polyethylene glycol (PEG1500) having a weight average molecular weight of 1500 is used instead of about 1.47 parts by weight (an equivalent ratio of 1.0) of polyethylene glycol (PEG600). Physical properties are measured by the same methods as in Example 1, and the measured results are reported in the following Table 1. Further, FIG. 1 (c) is a TEM image of the thermoplastic resin prepared according to Example 3.

Example 4

A thermoplastic resin is prepared by the same method as in Example 1 except that a mixture of 10 parts by weight of toluene, about 0.02 parts by weight of 1,1-bis(t-butylperoxy)cyclohexane (PHX-C), about 0.2 parts by weight of t-dodecyl mercaptan (TDM) and about 1.92 parts by weight (an equivalent ratio of 1.0) of polyethylene glycol (PEG600) having a weight average molecular weight of about 600 with about 100 parts by weight of a second monomer mixture including about 72 parts by weight of styrene (SM), about 25 parts by weight of acrylonitrile and about 3 parts by weight of butyl acrylate is injected into the second reactor (R-2) of the continuous polymerization reactor at a rate of about 6.5 kg/hr and the polymerization conversion ratio in the third reactor (R-3) is about 61%. Physical properties are measured by the same methods as in Example 1, and the measured results are reported in the following Table 1. Further, FIG. 1 (d) is a TEM image of the thermoplastic resin prepared according to Example 4.

Example 5

A thermoplastic resin is prepared by the same method as in Example 1 except that the first reactant is prepared by mixing about 100 parts by weight of toluene, about 0.15 parts by weight of benzoyl peroxide (BPO) and about 0.05 parts by weight of t-dodecyl mercaptan (TDM) with about 100 parts by weight of a first monomer mixture including about 88 parts by weight of butyl acrylate (BA), about 5 parts by weight of styrene (SM), about 2 parts by weight of acrylonitrile (AN) and about 5 parts by weight of (meth)acrylic acid (MAA), the prepared first reactant is injected into the first reactor (R-1) of the continuous polymerization reactor at a rate of about 1 kg/hr to polymerize the first reactant at a temperature of about 85° C. for a residence time of 8 hours and the polymerization conversion ratio in the first reactor (R-1) is about 94%. Physical properties are measured by the same methods as in Example 1, and the measured results are reported in the following Table 1. Further, FIG. 1 (e) is a TEM image of the thermoplastic resin prepared according to Example 5.

Example 6

A thermoplastic resin is prepared by the same method as in Example 1 except that about 3.67 parts by weight (an equivalent ratio of 2.5) of polyethylene glycol (PEG600) is used instead of about 1.47 parts by weight (an equivalent ratio of 1.0) thereof. Physical properties are measured by the same methods as in Example 1, and the measured results are reported in the following Table 1. Further, FIG. 1 (f) is a TEM image of the thermoplastic resin prepared according to Example 6.

Example 7

A first reactant is prepared by mixing about 100 parts by weight of toluene, about 0.2 parts by weight of benzoyl peroxide (BPO) and about 0.05 parts by weight of t-dodecyl mercaptan (TDM) with 100 parts by weight of a first monomer mixture including about 88 parts by weight of butyl acrylate (BA), about 5 parts by weight of styrene (SM), about 2 parts by weight of acrylonitrile (AN) and about 5 parts by weight of 2-hydroxyethyl acrylate (HEA). A polymer is prepared by polymerizing the first reactant at a temperature of about 80° C. for a residence time of about 8 hours after injecting the prepared first reactant at a rate of about 1 kg/hr into a first reactor (R-1) of a continuous polymerization reactor having three reactors, which are connected to one another in series, and in which jackets are installed to easily control the reaction temperature. The polymerization conversion ratio is about 91%, and the polymer prepared in the first reactor (R-1) is successively injected into a second reactor (R-2) of the continuous polymerization reactor.

A second reactant is prepared by mixing about 10 parts by weight of toluene, about 0.02 parts by weight of 1,1-bis(t-butylperoxy)cyclohexane (PHX-C), 0.1 parts by weight of t-dodecyl mercaptan (TDM) and about 0.95 parts by weight (an equivalent ratio of 1.0) of decanedioic acid with 100 parts by weight of a second monomer mixture including about 75 parts by weight of styrene (SM), about 23 parts by weight of acrylonitrile (AN) and about 2 parts by weight of butyl acrylate (BA). A polymer is prepared by polymerizing the second reactant at a temperature of about 110° C. for a residence time of about 2 hours after injecting the prepared second reactant at a rate of about 8 kg/hr into the second reactor (R-2) of the continuous polymerization reactor. The polymerization conversion ratio is about 27%.

The polymer prepared in the second reactor (R-2) is successively injected into a third reactor (R-3) of the continuous polymerization reactor to polymerize the prepared polymer at a temperature of about 130° C. for a residence time of about 2 hours. The polymerization conversion ratio is about 58%.

A thermoplastic resin is prepared in the shape of pellets using a pelletizer after successively injecting a resulting polymer discharged from the third reactor (R-3) into a devolatilization vessel maintained at about 240° C. and about 20 Torr and removing non-reacted monomers and solvents from the resulting polymer.

Physical properties are measured by the same methods as in Example 1, and the measured results are reported in the following Table 2. Further, FIG. 2 (a) is a TEM image of the thermoplastic resin prepared according to Example 7.

Example 8

A thermoplastic resin is prepared by the same method as in Example 7 except that about 0.43 parts by weight (an equivalent ratio of 1.5) of butanedioic acid is used instead of about 0.95 parts by weight (an equivalent ratio of 1.0) of decanedioic acid, the polymerization conversion ratio in the second reactor (R-2) is about 26%, and the polymerization conversion ratio in the third reactor (R-3) is about 56%. Physical properties are measured by the same methods as in Example 1, and the measured results are reported in the following Table 2. Further, FIG. 2 (b) is a TEM image of the thermoplastic resin prepared according to Example 8.

Example 9

A thermoplastic resin is prepared by the same method as in Example 7 except that a second reactant is prepared by mixing about 10 parts by weight of toluene, about 0.02 parts by weight of 1,1-bis(t-butylperoxy)cyclohexane (PHX-C), about 0.2 parts by weight of t-dodecyl mercaptan (TDM) and about 0.19 parts by weight (an equivalent ratio of 0.5) of butanedioic acid with about 100 parts by weight of a second monomer mixture including about 70 parts by weight of styrene (SM), about 28 parts by weight of acrylonitrile (AN) and about 2 parts by weight of butyl acrylate (BA), the second reactant is injected into the second reactor (R-2) of the continuous polymerization reactor at a rate of about 6 kg/hr, and the polymerization conversion ratio in the second reactor (R-2) is about 25%. Physical properties are measured by the same methods as in Example 1, and the measured results are reported in the following Table 2. Further, FIG. 2 (c) is a TEM image of the thermoplastic resin prepared according to Example 9.

Example 10

A thermoplastic resin is prepared by the same method as in Example 7 except that about 2.39 parts by weight (an equivalent ratio of 2.5) of decanedioic acid instead of about 0.95 parts by weight (an equivalent ratio of 1.0) thereof is used. Physical properties are measured by the same methods as in Example 1, and the measured results are reported in the following Table 2. Further, FIG. 2 (d) is a TEM image of the thermoplastic resin prepared according to Example 10.

Comparative Example 1

A thermoplastic resin in the shape of pellets is obtained by kneading (mixing) about 40 parts by weight of an acrylate rubber, in which styrene and acrylonitrile are grafted to a butyl acrylate rubber, and about 60 parts by weight of a styrene-acrylonitrile copolymer under a temperature condition of about 220° C. in a twin screw extruder. Physical properties are measured by the same methods as in Example 1, and the measured results are reported in the following Table 3. Further, FIG. 3 (a) is a TEM image of the thermoplastic resin prepared in Comparative Example 1.

Comparative Example 2

A thermoplastic resin is prepared by the same method as in Example 1 except that polyethylene glycol (PEG600) is not used at all. Physical properties are measured by the same methods as in Example 1, and the measured results are reported in the following Table 3. Further, FIG. 3 (b) is a TEM image of the thermoplastic resin prepared in Comparative Example 2.

Comparative Example 3

A thermoplastic resin is prepared by the same method as in Example 1 except that acrylic acid (AA) is not used at all. Physical properties are measured by the same methods as in Example 1, and the measured results are reported in the following Table 3. Further, FIG. 3 (c) is a TEM image of the thermoplastic resin prepared in Comparative Example 3.

Comparative Example 4

A thermoplastic resin is prepared by the same method as in Example 1 except that about 5.15 parts by weight (an equivalent ratio of 3.5) of polyethylene glycol (PEG600) is used instead of about 1.47 parts by weight (an equivalent ratio of 1.0) thereof. Physical properties are measured by the same methods as in Example 1, and the measured results are reported in the following Table 3.

Comparative Example 5

A thermoplastic resin is prepared by the same method as in Example 7 except that decanedioic acid is not used at all.

Physical properties are measured by the same methods as in Example 1, and the measured results are reported in the following Table 4. Further, FIG. 4 (*a*) is a TEM image of the thermoplastic resin prepared in Comparative Example 5.

Comparative Example 6

A thermoplastic resin is prepared by the same method as in Example 7 except that 2-hydroxyethyl acrylate (HEA) is not used at all. Physical properties are measured by the same methods as in Example 1, and the measured results are reported in the following Table 4. Further, FIG. 4 (*b*) is a TEM image of the thermoplastic resin prepared in Comparative Example 6.

Comparative Example 7

A thermoplastic resin is prepared by the same method as in Example 7 except that about 3.33 parts by weight (an equivalent ratio of 3.5) of decanedioic acid is used instead of about 0.95 parts by weight (an equivalent ratio of 1.0) thereof. Physical properties are measured by the same methods as in Example 1, and the measured results are reported in the following Table 4.

TABLE 1

|  |  | Example 1 | Example 2 | Example 3 | Example 4 | Example 5 | Example 6 |
|---|---|---|---|---|---|---|---|
| R-1 | BA/SM/AN | 90/5/2 | 90/5/2 | 90/5/2 | 90/5/2 | 88/5/2 | 90/5/2 |
|  | AA | 3 | 3 | 3 | 3 | — | 3 |
|  | MAA | — | — | — | — | 5 | — |
|  | Toluene | 100 | 100 | 100 | 100 | 100 | 100 |
|  | BPO | 0.2 | 0.2 | 0.2 | 0.2 | 0.15 | 0.2 |
|  | TDM | 0.05 | 0.05 | 0.05 | 0.05 | 0.05 | 0.05 |
|  | Injected flow rate (kg/hr) | 1 | 1 | 1 | 1 | 1 | 1 |
|  | Reaction temperature (° C.) | 80 | 80 | 80 | 80 | 85 | 80 |
|  | Residence time (hr) | 8 | 8 | 8 | 8 | 8 | 8 |
|  | Polymerization conversion ratio (%) | 90 | 90 | 90 | 90 | 94 | 90 |
| R-2 | SM/AN/BA | 72/25/3 | 72/25/3 | 72/25/3 | 72/25/3 | 72/25/3 | 72/25/3 |
|  | Compound having two or more hydroxyl groups | PEG600 | 1,4-BDO | PEG1500 | PEG600 | PEG600 | PEG600 |
|  | Equivalent ratio | 1 | 1.5 | 0.5 | 1 | 1 | 2.5 |
|  | Toluene | 10 | 10 | 10 | 10 | 10 | 10 |
|  | PHX-C | 0.02 | 0.02 | 0.02 | 0.02 | 0.02 | 0.02 |
|  | TDM | 0.1 | 0.1 | 0.1 | 0.2 | 0.1 | 0.1 |
|  | Injected flow rate (kg/hr) | 8.5 | 8.5 | 8.5 | 6.5 | 8.5 | 8.5 |
|  | Reaction temperature (° C.) | 110 | 110 | 110 | 110 | 110 | 110 |
|  | Residence time (hr) | 2 | 2 | 2 | 2 | 2 | 2 |
|  | Polymerization conversion ratio (%) | 25 | 26 | 25 | 26 | 27 | 25 |
| R-3 | Reaction temperature (° C.) | 130 | 130 | 130 | 130 | 130 | 130 |
|  | Residence time (hr) | 2 | 2 | 2 | 2 | 2 | 2 |
|  | Polymerization conversion ratio (%) | 55 | 56 | 56 | 61 | 55 | 55 |
| Physical properties | Flow index (g/10 min) | 7 | 6.6 | 7.3 | 5.3 | 6.2 | 12.8 |
|  | Weight-average molecular weight | 210,000 | 193,000 | 197,000 | 188,000 | 191,000 | 203,000 |
|  | Content (%) of the disperse phase | 17.4 | 17.1 | 17.2 | 19.9 | 18.2 | 17.6 |
|  | Izod impact strength (kgf · cm/cm) | 10 | 9.6 | 10.1 | 11.5 | 10.8 | 9.7 |
|  | Yellowness | 17.5 | 17.9 | 17.3 | 18.8 | 18.2 | 17.2 |
|  | Vicat softening point (° C.) | 92 | 93 | 92 | 89 | 91 | 83 |
|  | Gloss | 18 | 18.3 | 17.8 | 15.6 | 16.6 | 20 |
|  | Delamination characteristics | 5 | 5 | 5 | 5 | 5 | 5 |
|  | Falling ball impact strength (J) | 5.5 | 5.2 | 5.3 | 6.1 | 5.8 | 4.8 |
|  | Weatherability | 2.7 | 2.6 | 2.6 | 2.7 | 2.6 | 2.7 |

TABLE 2

|  |  | Example 7 | Example 8 | Example 9 | Example 10 |
|---|---|---|---|---|---|
| R-1 | BA/SM/AN | 88/5/2 | 88/5/2 | 88/5/2 | 88/5/2 |
|  | HEA | 5 | 5 | 5 | 5 |
|  | Toluene | 100 | 100 | 100 | 100 |
|  | BPO | 0.2 | 0.2 | 0.2 | 0.2 |
|  | TDM | 0.05 | 0.05 | 0.05 | 0.05 |
|  | Injected flow rate (kg/hr) | 1 | 1 | 1 | 1 |
|  | Reaction temperature (° C.) | 80 | 80 | 80 | 80 |
|  | Residence time (hr) | 8 | 8 | 8 | 8 |
|  | Polymerization conversion ratio (%) | 91 | 90 | 90 | 90 |
| R-2 | SM/AN/BA | 75/23/2 | 75/23/2 | 70/28/2 | 75/23/2 |
|  | Compound having two or more carboxyl groups | Decanedioic acid | Butanedioic acid | Butanedioic acid | Decanedioic acid |
|  | Equivalent ratio | 1 | 1.5 | 0.5 | 2.5 |
|  | Toluene | 10 | 10 | 10 | 10 |
|  | PHX-C | 0.02 | 0.02 | 0.02 | 0.02 |
|  | TDM | 0.1 | 0.1 | 0.1 | 0.1 |
|  | Injected flow rate (kg/hr) | 8 | 8 | 6 | 8 |
|  | Reaction temperature (° C.) | 110 | 110 | 110 | 110 |
|  | Residence time (hr) | 2 | 2 | 2 | 2 |
|  | Polymerization conversion ratio (%) | 27 | 26 | 25 | 26 |

TABLE 2-continued

|  |  | Example 7 | Example 8 | Example 9 | Example 10 |
|---|---|---|---|---|---|
| R-3 | Reaction temperature (° C.) | 130 | 130 | 130 | 130 |
|  | Residence time (hr) | 2 | 2 | 2 | 2 |
|  | Polymerization conversion ratio (%) | 58 | 56 | 58 | 57 |
| Physical properties | Flow index (g/10 min) | 6.5 | 7.2 | 5.8 | 12.8 |
|  | Weight-average molecular weight | 205,000 | 196,000 | 189,000 | 201,000 |
|  | Content (%) of the disperse phase | 16.8 | 17.2 | 20.7 | 17 |
|  | Izod impact strength (kgf · cm/cm) | 9.8 | 10.4 | 10.6 | 9.5 |
|  | Yellowness | 16.9 | 17.5 | 18.3 | 17.1 |
|  | Vicat softening point (° C.) | 91.5 | 91 | 92.5 | 84 |
|  | Gloss | 18.4 | 17.9 | 17 | 21 |
|  | Delamination characteristics | 5 | 5 | 5 | 5 |
|  | Falling ball impact strength (J) | 5.4 | 5.5 | 5.9 | 5.4 |
|  | Weatherability | 2.5 | 2.7 | 2.7 | 2.5 |

TABLE 3

|  |  | Comparative Example 1 | Comparative Example 2 | Comparative Example 3 | Comparative Example 4 |
|---|---|---|---|---|---|
| R-1 | BA/SM/AN | — | 90/5/2 | 90/5/2 | 90/5/2 |
|  | AA | — | 3 | — | 3 |
|  | MAA | — | — | — | — |
|  | Toluene | — | 100 | 100 | 100 |
|  | BPO | — | 0.2 | 0.2 | 0.2 |
|  | TDM | — | 0.05 | 0.05 | 0.05 |
|  | Injected flow rate (kg/hr) | — | 1 | 1 | 1 |
|  | Reaction temperature (° C.) | — | 80 | 80 | 80 |
|  | Residence time (hr) | — | 8 | 8 | 8 |
|  | Polymerization conversion ratio (%) | — | 90 | 90 | 90 |
| R-2 | SM/AN/BA | — | 72/25/3 | 72/25/3 | 72/25/3 |
|  | Compound having two or more hydroxyl groups | — | — | PEG600 | PEG600 |
|  | Equivalent ratio | — | — | 1 | 3.5 |
|  | Toluene | — | 10 | 10 | 10 |
|  | PHX-C | — | 0.02 | 0.02 | 0.02 |
|  | TDM | — | 0.1 | 0.1 | 0.1 |
|  | Injected flow rate (kg/hr) | — | 8.5 | 8.5 | 8.5 |
|  | Reaction temperature (° C.) | — | 110 | 110 | 110 |
|  | Residence time (hr) | — | 2 | 2 | 2 |
|  | Polymerization conversion ratio (%) | — | 25 | 25 | 25 |
| R-3 | Reaction temperature (° C.) | — | 130 | 130 | 130 |
|  | Residence time (hr) | — | 2 | 2 | 2 |
|  | Polymerization conversion ratio (%) | — | 55 | 55 | 55 |
| Physical properties | Flow index (g/10 min) | 4.3 | 11.2 | 16.2 | 15.8 |
|  | Weight-average molecular weight | 140,000 | 198,000 | 186,000 | 197,000 |
|  | Content (%) of the disperse phase | 19.5 | 17.2 | 17.5 | 17.4 |
|  | Izod impact strength (kgf · cm/cm) | 11.2 | 3.5 | 3.1 | 5.8 |
|  | Yellowness | 25.5 | 17.2 | 16.1 | 17.5 |
|  | Vicat softening point (° C.) | 90 | 91 | 90 | 79 |
|  | Gloss | 93 | 45 | 48 | 38 |
|  | Delamination characteristics | 4 | 3 | 2 | 4 |
|  | Falling ball impact strength (J) | 6.2 | 2.7 | 2.1 | 3.2 |
|  | Weatherability | 2.8 | 2.6 | 2.7 | 2.7 |

TABLE 4

|  |  | Comparative Example 5 | Comparative Example 6 | Comparative Example 7 |
|---|---|---|---|---|
| R-1 | BA/SM/AN | 90/5/2 | 90/5/2 | 88/5/2 |
|  | HEA | 3 | — | 5 |
|  | Toluene | 100 | 100 | 100 |
|  | BPO | 0.2 | 0.2 | 0.2 |
|  | TDM | 0.05 | 0.05 | 0.05 |
|  | Injected flow rate (kg/hr) | 1 | 1 | 1 |
|  | Reaction temperature (° C.) | 80 | 80 | 80 |
|  | Residence time (hr) | 8 | 8 | 8 |
|  | Polymerization conversion ratio (%) | 90 | 90 | 90 |
| R-2 | SM/AN/BA | 72/25/3 | 75/25/3 | 75/23/2 |
|  | Compound having two or more carboxyl groups | — | Decanedioic acid | Decanedioic acid |

TABLE 4-continued

|  |  | Comparative Example 5 | Comparative Example 6 | Comparative Example 7 |
|---|---|---|---|---|
|  | Equivalent ratio | — | 1 | 3.5 |
|  | Toluene | 10 | 10 | 10 |
|  | PHX-C | 0.02 | 0.02 | 0.02 |
|  | TDM | 0.1 | 0.1 | 0.1 |
|  | Injected flow rate (kg/hr) | 8 | 8 | 8 |
|  | Reaction temperature (° C.) | 110 | 110 | 110 |
|  | Residence time (hr) | 2 | 2 | 2 |
|  | Polymerization conversion ratio (%) | 25 | 25 | 26 |
| R-3 | Reaction temperature (° C.) | 130 | 130 | 130 |
|  | Residence time (hr) | 2 | 2 | 2 |
|  | Polymerization conversion ratio (%) | 55 | 55 | 57 |
| Physical properties | Flow index (g/10 min) | 10.8 | 17.5 | 15.2 |
|  | Weight-average molecular weight | 193,000 | 182,000 | 200,000 |
|  | Content (%) of the disperse phase | 17.2 | 17 | 17.3 |
|  | Izod impact strength (kgf · cm/cm) | 3.3 | 3.3 | 6.5 |
|  | Yellowness | 18.2 | 16.1 | 17.5 |
|  | Vicat softening point (° C.) | 91 | 90 | 78 |
|  | Gloss | 41 | 50 | 39 |
|  | Delamination characteristics | 3 | 2 | 4 |
|  | Falling ball impact strength (J) | 2.6 | 2.5 | 4.1 |
|  | Weatherability | 2.7 | 2.6 | 2.6 |

As reported in Tables 1 to 4, thermoplastic resins of the present invention prepared according to Examples 1 to 10 have excellent low gloss characteristics of a gloss value of 21 or less measured using a 75 Degree Gloss Meter while maintaining excellent physical properties, including flow index, Izod impact strength, Vicat softening point, falling ball impact strength, weatherability, and the like, which the thermoplastic resins generally has. Further, the thermoplastic resins of Examples 1 to 10 have excellent delamination characteristics and yellowness.

In contrast, the thermoplastic resin of Comparative Example 1 prepared by kneading a small-sized rubber phase using a twin screw kneader has very high gloss although maintaining good Izod impact strength and falling ball impact strength.

Also, in Comparative Example 2 in which the compound having two or more hydroxyl groups is not injected, gloss increased, impact strength decreased, and delamination characteristics are not good since a network-shaped disperse phase is not formed as illustrated in FIG. 3 (b). Further, in Comparative Example 3 in which an unsaturated carboxylic acid or its anhydride is not injected, gloss increased, impact strength decreased, and delamination characteristics are not good since a network-shaped disperse phase is not formed (see FIG. 3 (c)). Stated differently, generally the dispersed phase of the polymer composition of Comparative Examples 2 and 3 is generally in the form of discrete islands surrounded by a matrix polymer, and the disperse polymer phases are largely unconnected to one another (i.e., do not form a network). Comparative Example 4 in which a compound having two or more hydroxyl groups is injected in an excessive amount as compared to Examples 1 to 6, the Vicat softening point rapidly dropped since excess amounts of the compound having two or more hydroxyl groups do not react with the unsaturated carboxylic acid or its anhydride and thus function as a plasticizer or the like within the continuous phase.

Furthermore, in Comparative Example 5 in which the compound having two or more hydroxyl groups is not injected, the network-shaped disperse phase also is not formed as illustrated FIG. 4 (a). In Comparative Example 6 in which an unsaturated compound having a hydroxyl group is not injected, gloss is high, impact resistance is lowered, and delamination characteristics are not good since the network-shaped disperse phase is not formed (see FIG. 4 (b)). In addition, in Comparative Example 7 in which a compound having two or more carboxyl groups is injected in an excessive amount as compared to Examples 7 to 10 the Vicat softening point rapidly dropped.

The aforementioned Examples and Comparative Examples demonstrate that thermoplastic resins according to the present invention can have excellent basic physical properties such as weatherability, impact resistance, thermal resistance, delamination characteristics and the like as well as excellent low gloss characteristics.

Thus the present invention can provide a weather resistant thermoplastic resin having excellent low gloss characteristics while maintaining superior physical properties including weatherability, impact resistance, thermal resistance, delamination characteristics, yellowness, fluidity, and the like.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A weather resistant thermoplastic resin having low gloss characteristics, comprising a (meth)acrylic acid alkyl ester-based polymer (A) and an aromatic vinyl-cyanide vinyl based copolymer (B), wherein the (meth)acrylic acid alkyl ester-based polymer (A) forms a network structure interconnecting disperse phases of the (meth)acrylic acid alkyl ester-based polymer (A), and the aromatic vinyl-cyanide vinyl based copolymer (B) forms a continuous phase.

2. The weather resistant thermoplastic resin having low gloss characteristics as claimed in claim 1, wherein the (meth) acrylic acid alkyl ester-based polymer (A) partially or entirely forms a network structure interconnecting disperse phases of the (meth)acrylic acid alkyl ester-based polymer (A).

3. The weather resistant thermoplastic resin having low gloss characteristics as claimed in claim 1, wherein the thermoplastic resin comprises about 5 to about 35% by weight of the (meth)acrylic acid alkyl ester-based polymer (A) and about 65 to about 95% by weight of the aromatic vinyl-cyanide vinyl based copolymer (B).

4. The weather resistant thermoplastic resin having low gloss characteristics as claimed in claim 1, wherein the (meth) acrylic acid alkyl ester-based polymer (A) is formed by polymerizing a mixture comprising a (meth)acrylic acid alkyl ester, an unsaturated carboxylic acid or its anhydride, and a compound having two or more hydroxyl groups.

5. The weather resistant thermoplastic resin having low gloss characteristics as claimed in claim 4, wherein the (meth) acrylic acid alkyl ester-based polymer (A) is formed by polymerizing about 60 to about 95% by weight of the (meth) acrylic acid alkyl ester, about 1 to about 20% by weight of the unsaturated carboxylic acid or its anhydride, about 0 to about 20% by weight of an aromatic vinyl-based compound, about 0 to about 10% by weight of a vinyl cyanide based compound, and the compound having two or more hydroxyl groups in an equivalent ratio of about 0.1 to about 3 based on the unsaturated carboxylic acid or its anhydride.

6. The weather resistant thermoplastic resin having low gloss characteristics as claimed in claim 1, wherein the (meth) acrylic acid alkyl ester-based polymer (A) comprises chains comprising a (meth)acrylic acid alkyl ester unit and an unsaturated carboxylic acid or its anhydride unit, and the carboxylic acid group of the unsaturated carboxylic acid or its anhydride unit is linked to a hydroxyl group of the compound having two or more hydroxyl groups by ester bonds.

7. The weather resistant thermoplastic resin having low gloss characteristics as claimed in claim 1, wherein the (meth) acrylic acid alkyl ester-based polymer (A) is formed by polymerizing a mixture comprising a (meth)acrylic acid alkyl ester, an unsaturated compound having a hydroxyl group, and a compound having two or more carboxyl groups.

8. The weather resistant thermoplastic resin having low gloss characteristics as claimed in claim 7, wherein the (meth) acrylic acid alkyl ester-based polymer (A) is formed by polymerizing about 60 to about 95% by weight of the (meth) acrylic acid alkyl ester, about 1 to about 20% by weight of the unsaturated compound having a hydroxyl group, about 0 to about 20% by weight of an aromatic vinyl-based compound, about 0 to about 10% by weight of a vinyl cyanide based compound, and the compound having two or more carboxyl groups in an equivalent ratio of about 0.1 to about 3 based on the unsaturated compound having a hydroxyl group.

9. The weather resistant thermoplastic resin having low gloss characteristics as claimed in claim 1, wherein the (meth) acrylic acid alkyl ester-based polymer (A) comprises chains comprising a (meth)acrylic acid alkyl ester unit and an unsaturated compound unit having a hydroxyl group, and the hydroxyl group of the unsaturated compound unit having a hydroxyl group is linked to a carboxyl group of the compound having two or more carboxyl groups by ester bonds.

10. The weather resistant thermoplastic resin having low gloss characteristics as claimed in claim 1, wherein the aromatic vinyl-cyanide vinyl based copolymer (B) is formed by polymerizing about 60 to about 95% by weight of an aromatic vinyl-based compound, about 5 to about 40% by weight of a vinyl cyanide based compound, and about 0 to about 10% by weight of a (meth)acrylic acid alkyl ester.

11. The weather resistant thermoplastic resin having low gloss characteristics as claimed in claim 1, wherein the weight-average molecular weight of the aromatic vinyl-cyanide vinyl based copolymer (B) is about 150,000 to about 300,000.

12. The weather resistant thermoplastic resin having low gloss characteristics as claimed in claim 1, wherein the gloss value of the thermoplastic resin is 30 or less measured by using a 75 Degree Gloss Meter.

13. The weather resistant thermoplastic resin having low gloss characteristics as claimed in claim 4, wherein the (meth) acrylic acid alkyl ester comprises methyl methacrylate, ethyl methacrylate, propyl methacrylate, butyl methacrylate, pentyl methacrylate, hexyl methacrylate, heptyl methacrylate, octyl methacrylate, methyl acrylate, ethyl acrylate, propyl acrylate, butyl acrylate, pentyl acrylate, hexyl acrylate, heptyl acrylate, octyl acrylate, or a combination thereof.

14. The weather resistant thermoplastic resin having low gloss characteristics as claimed in claim 7, wherein the (meth) acrylic acid alkyl ester comprise methyl methacrylate, ethyl methacrylate, propyl methacrylate, butyl methacrylate, pentyl methacrylate, hexyl methacrylate, heptyl methacrylate, octyl methacrylate, methyl acrylate, ethyl acrylate, propyl acrylate, butyl acrylate, pentyl acrylate, hexyl acrylate, heptyl acrylate, octyl acrylate, or a combination thereof.

15. The weather resistant thermoplastic resin having low gloss characteristics as claimed in claim 10, wherein the (meth)acrylic acid alkyl ester comprises methyl methacrylate, ethyl methacrylate, propyl methacrylate, butyl methacrylate, pentyl methacrylate, hexyl methacrylate, heptyl methacrylate, octyl methacrylate, methyl acrylate, ethyl acrylate, propyl acrylate, butyl acrylate, pentyl acrylate, hexyl acrylate, heptyl acrylate, octyl acrylate, or a combination thereof.

16. The weather resistant thermoplastic resin having low gloss characteristics as claimed in claim 4, wherein the unsaturated carboxylic acid or its anhydride comprises acrylic acid, methacrylic acid, maleic acid, maleic anhydride, fumaric acid, fumaric anhydride, or a combination thereof; and the compound having two or more hydroxyl groups comprises C2 to C10 alkanediol, ethylene glycol, polyethylene glycol, propylene glycol, polypropylene glycol, polyol, or a combination thereof.

17. The weather resistant thermoplastic resin having low gloss characteristics as claimed in claim 7, wherein the unsaturated compound having a hydroxyl group comprises hydroxyalkyl acrylate, hydroxyalkyl methacrylate, or a combination thereof; and the compound having two or more carboxyl groups comprises C2 to C10 alkanedioic acid, polyacid, or a combination thereof.

18. The weather resistant thermoplastic resin having low gloss characteristics as claimed in claim 5, wherein the aromatic vinyl-based compound comprises styrene, α-methyl styrene, para-methyl styrene, or a combination thereof; and the vinyl cyanide based compound comprises acrylonitrile, methacrylonitrile, ethacrylonitrile, or a combination thereof.

19. The weather resistant thermoplastic resin having low gloss characteristics as claimed in claim 8, wherein the aromatic vinyl-based compound comprises styrene, α-methyl styrene, para-methyl styrene, or a combination thereof; and the vinyl cyanide based compound comprises acrylonitrile, methacrylonitrile, ethacrylonitrile, or a combination thereof.

20. The weather resistant thermoplastic resin having low gloss characteristics as claimed in claim 10, wherein the aromatic vinyl-based compound comprises styrene, α-methyl styrene, para-methyl styrene, or a combination thereof; and the vinyl cyanide based compound comprises acrylonitrile, methacrylonitrile, ethacrylonitrile, or a combination thereof.

21. A method of preparing a weather resistant thermoplastic resin having low gloss characteristics, comprising the steps of successively injecting a first monomer mixture comprising a (meth)acrylic acid alkyl ester and an unsaturated carboxylic acid or its anhydride into a first reactor among plural reactors connected to each other in series to polymerize the first monomer mixture; and successively injecting the polymer polymerized in the first reactor, a second monomer mixture comprising an aromatic vinyl-based compound and a vinyl cyanide based compound, and a compound having two or more hydroxyl groups into a second reactor to polymerize them to form a (meth)acrylic acid alkyl ester-based polymer (A) in the form of a network structure interconnecting disperse phases thereof and a continuous phase comprising an aromatic vinyl-cyanide vinyl based copolymer (B).

22. The method of preparing a weather resistant thermoplastic resin having low gloss characteristics as claimed in claim 21, wherein the polymerization conversion ratio into polymer in the first reactor is about 85% to about 95%.

23. The method of preparing a weather resistant thermoplastic resin having low gloss characteristics as claimed in claim 21, wherein the polymerization conversion ratio into the thermoplastic resin in the final reactor among the plural reactors is about 50% to about 70%.

24. The method of preparing a weather resistant thermoplastic resin having low gloss characteristics as claimed in claim 21, wherein the plural reactors includes 2 to 5 reactors.

25. The method of preparing a weather resistant thermoplastic resin having low gloss characteristics as claimed in claim 21, further comprising controlling the flow rate of the reactant injected into the second reactor so that the reactant injected into the second reactor includes about 5 to about 15% by weight of the polymer polymerized in the first reactor and about 85 to about 95% by weight of the total of the second monomer mixture and the compound having two or more hydroxyl groups.

26. The method of preparing a weather resistant thermoplastic resin having low gloss characteristics as claimed in claim 21, wherein the first monomer mixture comprises about 60 to about 95% by weight of the (meth)acrylic acid alkyl ester, about 1 to about 20% by weight of the unsaturated carboxylic acid or its anhydride, about 0 to about 20% by weight of the aromatic vinyl-based compound, and about 0 to about 10% by weight of the vinyl cyanide based compound.

27. The method of preparing a weather resistant thermoplastic resin having low gloss characteristics as claimed in claim 21, wherein the second monomer mixture comprises about 60 to about 95% by weight of the aromatic vinyl-based compound, about 5 to about 40% by weight of the vinyl cyanide based compound, and about 0 to about 10% by weight of the (meth)acrylic acid alkyl ester; and the compound having two or more hydroxyl groups is injected in an equivalent ratio of about 0.1 to about 3 based on the unsaturated carboxylic acid or its anhydride.

28. A method of preparing a weather resistant thermoplastic resin having low gloss characteristics, comprising the steps of successively injecting a first monomer mixture comprising a (meth)acrylic acid alkyl ester and a compound having two or more hydroxyl groups into a first reactor among plural reactors connected to each other in series to polymerize the first monomer mixture; and successively injecting the polymer polymerized in the first reactor, a second monomer mixture comprising an aromatic vinyl-based compound and a vinyl cyanide based compound, and a compound having two or more carboxyl groups into a second reactor to polymerize them to form a (meth)acrylic acid alkyl ester-based polymer (A) in the form of a network structure interconnecting disperse phases thereof and a continuous phase comprising an aromatic vinyl-cyanide vinyl based copolymer (B).

29. The method of preparing a weather resistant thermoplastic resin having low gloss characteristics as claimed in claim 28, wherein the polymerization conversion ratio into polymer in the first reactor is about 85% to about 95%.

30. The method of preparing a weather resistant thermoplastic resin having low gloss characteristics as claimed in claim 28, wherein the polymerization conversion ratio into the thermoplastic resin in the final reactor among the plural reactors is about 50% to about 70%.

31. The method of preparing a weather resistant thermoplastic resin having low gloss characteristics as claimed in claim 28, wherein the plural reactors includes 2 to 5 reactors.

32. The method of preparing a weather resistant thermoplastic resin having low gloss characteristics as claimed in claim 28, further comprising controlling the flow rate of the reactant injected into the second reactor so that the reactant injected into the second reactor includes about 5 to about 15% by weight of the polymer polymerized in the first reactor and about 85 to about 95% by weight of the total of the second monomer mixture and the compound having two or more carboxyl groups.

33. The method of preparing a weather resistant thermoplastic resin having low gloss characteristics as claimed in claim 28, wherein the first monomer mixture comprises about 60 to about 95% by weight of the (meth)acrylic acid alkyl ester, about 1 to about 20% by weight of the compound having two or more hydroxyl groups, about 0 to about 20% by weight of the aromatic vinyl-based compound, and about 0 to about 10% by weight of the vinyl cyanide based compound.

34. The method of preparing a weather resistant thermoplastic resin having low gloss characteristics as claimed in claim 28, wherein the second monomer mixture comprises about 60 to about 95% by weight of the aromatic vinyl-based compound, about 5 to about 40% by weight of the vinyl cyanide based compound, and about 0 to about 10% by weight of the (meth)acrylic acid alkyl ester; and the compound having two or more carboxyl groups is injected in an equivalent ratio of about 0.1 to about 3 based on the unsaturated compound having a hydroxyl group.

* * * * *